(12) United States Patent
Yu et al.

(10) Patent No.: US 12,549,273 B2
(45) Date of Patent: Feb. 10, 2026

(54) COMMUNICATION METHOD AND APPARATUS

(71) Applicant: HUAWEI TECHNOLOGIES CO., LTD., Guangdong (CN)

(72) Inventors: Guanding Yu, Hangzhou (CN); Xinyi Xu, Hangzhou (CN); Shengli Liu, Hangzhou (CN); Jian Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 18/463,446

(22) Filed: Sep. 8, 2023

(65) Prior Publication Data

US 2023/0421286 A1 Dec. 28, 2023

Related U.S. Application Data

(63) Continuation of application No. PCT/CN2022/079819, filed on Mar. 9, 2022.

(30) Foreign Application Priority Data

Mar. 11, 2021 (CN) .......................... 202110265729.1

(51) Int. Cl.
*H04L 1/00* (2006.01)
(52) U.S. Cl.
CPC ................................. *H04L 1/0003* (2013.01)
(58) Field of Classification Search
CPC ... H04L 1/0003; H04L 1/0016; H04L 1/0009; G06N 20/00; G06N 3/08
See application file for complete search history.

(56) References Cited

U.S. PATENT DOCUMENTS

| | | | |
|---|---|---|---|
| 11,622,291 B2* | 4/2023 | Pantelidou | H04W 24/10 370/252 |
| 2022/0101130 A1* | 3/2022 | Taherzadeh Boroujeni | G06N 3/08 |
| 2022/0103221 A1* | 3/2022 | Taherzadeh Boroujeni | G06N 3/063 |
| 2022/0124518 A1* | 4/2022 | Pezeshki | G06N 20/00 |

(Continued)

FOREIGN PATENT DOCUMENTS

| | | | |
|---|---|---|---|
| CN | 115085858 A * | 9/2022 | G06N 20/00 |
| EP | 4293938 A1 * | 12/2023 | H04L 1/0003 |

(Continued)

*Primary Examiner* — Shean Tokuta
(74) *Attorney, Agent, or Firm* — Rimon PC

(57) ABSTRACT

A communication method, apparatus, and computer-readable storage medium are provided to improve the efficiency of federated learning by determining a modulation and coding scheme that maximizes training efficiency of a second learning model. The modulation and coding scheme is used for processing information about a first learning model of a first communication apparatus and the information about the first learning model is used for determining the second learning model, where the second learning model is configured to update the first learning model of the first communication apparatus. The modulation and coding scheme is determined based on a first norm where the first norm is a norm of a gradient of the first learning model of the first communication apparatus. The first norm of the first communication apparatus represents an importance degree of a local dataset of the first communication apparatus.

10 Claims, 10 Drawing Sheets

(56) References Cited

U.S. PATENT DOCUMENTS

| | | | | |
|---|---|---|---|---|
| 2022/0124628 A1* | 4/2022 | Pezeshki | | H04W 72/20 |
| 2022/0124779 A1* | 4/2022 | Pezeshki | | G06N 20/20 |
| 2022/0180251 A1* | 6/2022 | Pezeshki | | G06N 20/20 |
| 2022/0182802 A1* | 6/2022 | Pezeshki | | G06N 3/08 |
| 2022/0237507 A1* | 7/2022 | Bai | | G06N 3/08 |
| 2022/0245527 A1* | 8/2022 | Choi | | G06N 20/20 |
| 2022/0368355 A1* | 11/2022 | Kumar Vankayala | | H04W 28/0268 |
| 2023/0244952 A1* | 8/2023 | Li | | H04W 72/1268 706/25 |
| 2025/0168659 A1* | 5/2025 | Kim | | H04W 24/02 |

FOREIGN PATENT DOCUMENTS

| | | | | |
|---|---|---|---|---|
| GB | 2625416 A * | 6/2024 | | G06N 3/096 |
| KR | 20250072519 A * | 5/2025 | | H04B 17/336 |
| WO | WO-2022025321 A1 * | 2/2022 | | H04W 74/0833 |
| WO | WO-2022045377 A1 * | 3/2022 | | H04B 17/336 |
| WO | WO-2022076863 A1 * | 4/2022 | | H04W 72/20 |
| WO | WO-2022164808 A1 * | 8/2022 | | G06N 20/20 |
| WO | WO-2022188790 A1 * | 9/2022 | | H04L 1/0009 |

\* cited by examiner

COMMUNICATION METHOD AND APPARATUS

CROSS-REFERENCE TO RELATED APPLICATIONS

This application is a continuation of International Application No. PCT/CN2022/079819, filed on Mar. 9, 2022, which claims priority to Chinese Patent Application No. 202110265729.1, filed on Mar. 11, 2021. The disclosures of the aforementioned applications are hereby incorporated by reference in their entireties.

TECHNICAL FIELD

This application relates to the field of communication technologies, and in particular, to a communication method and apparatus.

BACKGROUND

Federated learning (FL) is an emerging artificial intelligence (AI) foundational technology. A design objective of federated learning is to perform efficient machine learning (ML) between a plurality of participants or a plurality of computing nodes while ensuring information security during big data exchange, protecting terminal data and personal data privacy, and ensuring legal compliance. While fully ensuring user data privacy and security, FL efficiently completes model learning tasks by promoting cooperation between edge devices and central-end servers.

When wireless federated learning is implemented based on a wireless communication network architecture, a local training result and a global learning model between an edge device and a central-end server are sent through a radio channel. In a typical wireless federated learning process, in any round of training, an edge device trains a global learning model from a central-end server based on local service data, to obtain a local training result. Then, the central-end server obtains the local training result of all or part of the edge devices through a radio channel, updates the global learning model based on the local training result, and delivers an updated global learning model to each edge device through the radio channel. Subsequently, the edge device trains the local service data based on the updated global learning model.

Efficiency of updating the global learning model based on the local training result is related to a modulation and coding scheme in which the edge device sends the local training result to the central-end server. In an existing wireless communication system, a modulation and coding scheme is generally selected based on a channel state. However, an optimal modulation and coding scheme selected based on a channel state may cause a reduction in training efficiency of a global learning model, resulting in a reduction in wireless federated learning efficiency.

SUMMARY

Embodiments of this application provide a communication method and apparatus, to improve efficiency of federated learning in a wireless communication network architecture.

According to a first aspect, embodiments of this application provide a communication method. The method may be applied to a first communication apparatus. The first communication apparatus may be a terminal device, or a chip or a chipset in a terminal device. The terminal device may serve as an edge device in federated learning.

The method includes: The first communication apparatus sends a first norm of the first communication apparatus. The first norm is a norm of a gradient of a first learning model of the first communication apparatus. The first communication apparatus may also obtain first information from a second communication apparatus. The first information indicates a modulation and coding scheme. The modulation and coding scheme is for processing information about the first learning model of the first communication apparatus, the information about the first learning model is for determining a second learning model, and the second learning model is configured to update the first learning model of the first communication apparatus. The modulation and coding scheme may be determined based on the first norm of the first communication apparatus.

By using the foregoing method, the second communication apparatus may determine the modulation and coding scheme based on the first norm of the first communication apparatus, and the first communication apparatus uploads the information about the first learning model based on the modulation and coding scheme. The first norm of the first communication apparatus represents an importance degree of a local dataset of the first communication apparatus, and the modulation and coding scheme used when a local training result is uploaded is determined based on the first norm, so that efficiency of federated learning can be improved.

According to a second aspect, embodiments of this application provide a communication method. The method may be applied to a second communication apparatus. The second communication apparatus may be a network device, or a chip or a chipset in a network device. The network device can serve as a central-end server in federated learning or be connected to a central-end server.

The method includes: The second communication apparatus obtains first norms of n first communication apparatuses. A first norm of an $i^{th}$ first communication apparatus is a norm of a gradient of a first learning model of the $i^{th}$ first communication apparatus, where $i=1, 2, \ldots, n$, and n is a positive integer. The second communication apparatus determines modulation and coding schemes of the n first communication apparatuses based on the first norms of the n first communication apparatuses. A modulation and coding scheme of the $i^{th}$ first communication apparatus is for processing information about the first learning model of the $i^{th}$ first communication apparatus, the information about the first learning model of the $i^{th}$ first communication apparatus is for determining a second learning model, and the second learning model is configured to update first learning models of the n first communication apparatuses. The second communication apparatus may also send first information. The first information indicates modulation and coding schemes of the n first communication apparatuses.

Optionally, the second communication apparatus may send the first information in a unicast, multicast, or broadcast manner.

In a possible design, the second communication apparatus may determine a modulation and coding scheme that maximizes training efficiency of a second learning model. The training efficiency is related to a reduced value of a loss function of an $N^{th}$ round of training of the second learning model and a first delay of the $N^{th}$ round of training of the second learning model, the reduced value of the loss function and the first delay are determined based on the first norms and the modulation and coding schemes, and N is a positive integer greater than or equal to 1.

In a possible design, the reduced value of the loss function is determined based on a gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme. The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

In a possible design, n is a positive integer greater than or equal to 2.

By using this design, transmission rates and bit error rates, in a process in which a plurality of first communication apparatuses respectively upload a parameter or a gradient of a first learning model, are considered in a determined coding scheme. That is, while ensuring that transmission of the parameter or the gradient of the first learning model is performed as correctly as possible, as little time as possible is used, so that federated learning efficiency for a plurality of first communication apparatuses is optimized.

In a possible design, n is equal to 1.

By using this design, a transmission rate and a bit error rate, in a process that the first communication apparatus uploads a parameter or a gradient of the first learning model, are considered in a determined coding scheme. That is, while ensuring that transmission of the parameter or the gradient of the first learning model is performed as correctly as possible, as little time as possible is used, so that federated learning efficiency for a plurality of first communication apparatuses is optimized. Further, the method decouples correlations of a plurality of first communication apparatuses, so that information exchange between the plurality of first communication apparatuses and the second communication apparatus can be performed asynchronously, thereby reducing signaling overheads for maintaining synchronous transmission between the plurality of first communication apparatuses.

For beneficial effects of the second aspect, refer to the description of the beneficial effects of the first aspect.

According to a third aspect, embodiments of this application provide a communication method. The method may be applied to a first communication apparatus. The first communication apparatus may be a terminal device, or a chip or a chipset in a terminal device. The terminal device may serve as an edge device in federated learning.

The method includes: The first communication apparatus determines a first norm. The first norm is a norm of a gradient of a first learning model of the first communication apparatus. The first communication apparatus determines a modulation and coding scheme based on the first norm. The modulation and coding scheme is for processing information about the first learning model of the first communication apparatus, the information about the first learning model is for determining a second learning model, and the second learning model is configured to update the first learning model of the first communication apparatus. The first communication apparatus may also send first information to a second communication apparatus, where the first information indicates the modulation and coding scheme.

According to the foregoing method, the first communication apparatus may determine the modulation and coding scheme based on the first norm of the first communication apparatus, and the first communication apparatus sends the information about the first learning model to the second network device based on the modulation and coding scheme. The first norm of the first communication apparatus represents an importance degree of a local dataset of the first communication apparatus, and the modulation and coding scheme used when a local training result is uploaded is determined based on the first norm, so that efficiency of federated learning can be improved. Further, the method decouples correlations of a plurality of first communication apparatuses, so that information exchange between the plurality of first communication apparatuses and the second communication apparatus can be performed asynchronously, thereby reducing signaling overheads for maintaining synchronous transmission between the plurality of first communication apparatuses.

In a possible design, the first communication apparatus determines a modulation and coding scheme that maximizes training efficiency of a second learning model. The training efficiency is related to a reduced value of a loss function of an $N^{th}$ round of training of the second learning model and a first delay of the $N^{th}$ round of training of the second learning model, the reduced value of the loss function and the first delay are determined based on the first norm and the modulation and coding scheme, and N is a positive integer greater than or equal to 1.

In a possible design, the reduced value of the loss function is determined based on a gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme. The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

According to a fourth aspect, embodiments of this application provide a communication method. The method may be applied to a second communication apparatus. The second communication apparatus may be a network device, or a chip or a chipset in a network device. The network device can serve as a central-end server in federated learning or be connected to a central-end server.

The method includes: The second communication apparatus obtains first information from a first communication apparatus. The first information indicates a modulation and coding scheme, the modulation and coding scheme is determined based on a first norm of the first communication apparatus, and the first norm is a norm of a gradient of a first learning model of the first communication apparatus. The second communication apparatus processes, based on the modulation and coding scheme, information from the first communication apparatus to obtain information about the first learning model of the first communication apparatus. The information about the first learning model is for determining a second learning model, and the second learning model is configured to update the first learning model of the first communication apparatus.

For beneficial effects of the fourth aspect, refer to the description of the beneficial effects of the third aspect.

According to a fifth aspect, this application provides a communication apparatus. The apparatus may be a communication device, or may be a chip or a chipset in the communication device. The communication device may be a terminal device. The apparatus may include a processing unit and a transceiver unit. When the apparatus is a communication device, the processing unit may be a processor, and the transceiver unit may be a transceiver. The apparatus may further include a storage module, and the storage module may be a memory. The storage module is configured to store instructions, and the processing unit executes the instructions stored in the storage module, so that the terminal device performs a corresponding function in the first aspect or any possible design of the first aspect. When the apparatus is the chip or the chipset in the communication device, the processing unit may be a processor, and the transceiver unit may be an input/output interface, a pin, a circuit, or the like. The processing unit executes the instructions stored in the storage module, so that the terminal device performs a corresponding function in the first aspect or any possible design of the first aspect. The storage module may be a storage module (for example, a register or a cache) in the chip or chipset, or may be a storage module outside the chip or chipset in the terminal device (for example, a read-only memory and a random access memory).

When performing an action performed by a first communication apparatus according to the first aspect, the processing unit may be configured to determine a first norm. The first norm is the norm of the gradient of the first learning model of the first communication apparatus. The transceiver unit may be configured to send the first norm. The transceiver unit may also obtain first information from a second communication apparatus, where the first information indicates a modulation and coding scheme. The modulation and coding scheme is for processing information about the first learning model of the first communication apparatus, the information about the first learning model is for determining a second learning model, and the second learning model is configured to update the first learning model of the first communication apparatus. For example, the modulation and coding scheme is determined based on the first norm of the first communication apparatus.

According to a sixth aspect, this application provides a communication apparatus. The apparatus may be a communication device, or may be a chip or a chipset in the communication device. The communication device may be a network device. The apparatus may include a processing unit and a transceiver unit. When the apparatus is a communication device, the processing unit may be a processor, and the transceiver unit may be a transceiver. The apparatus may further include a storage module, and the storage module may be a memory. The storage module is configured to store instructions, and the processing unit executes the instructions stored in the storage module, so that the network device performs a corresponding function in the second aspect or any possible design of the second aspect. When the apparatus is the chip or the chipset in the communication device, the processing unit may be a processor, and the transceiver unit may be an input/output interface, a pin, a circuit, or the like. The processing unit executes the instructions stored in the storage module, so that the network device performs a corresponding function in the second aspect or any possible design of the second aspect. The storage module may be a storage module (for example, a register or a cache) in the chip or chipset, or may be a storage module outside the chip or chipset in the network device (for example, a read-only memory and a random access memory).

When performing an action performed by the second communication apparatus according to the second aspect, the transceiver unit may be configured to obtain first norms of n first communication apparatuses. A first norm of an $i^{th}$ first communication apparatus is a norm of a gradient of a first learning model of the $i^{th}$ first communication apparatus, where i=1, 2, ..., n, and n is a positive integer. The processing unit may be configured to determine modulation and coding schemes of the n first communication apparatuses based on the first norms of the n first communication apparatuses. A modulation and coding scheme of the $i^{th}$ first communication apparatus is for processing information about the first learning model of the $i^{th}$ first communication apparatus, the information about the first learning model of the $i^{th}$ first communication apparatus is for determining a second learning model, and the second learning model is configured to update first learning models of the n first communication apparatuses. The transceiver unit may also be configured to send first information. The first information indicates modulation and coding schemes of the n first communication apparatuses.

In a possible design, the processing unit may determine a modulation and coding scheme that maximizes training efficiency of a second learning model. The training efficiency is related to a reduced value of a loss function of an $N^{th}$ round of training of the second learning model and a first delay of the $N^{th}$ round of training of the second learning model, the reduced value of the loss function and the first delay are determined based on the first norms and the modulation and coding schemes, and N is a positive integer greater than or equal to 1.

In a possible design, the reduced value of the loss function is determined based on a gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme. The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

In a possible design, n is a positive integer greater than or equal to 2.

In a possible design, n is equal to 1.

According to a seventh aspect, this application provides a communication apparatus. The apparatus may be a communication device, or may be a chip or a chipset in the communication device. The communication device may be a terminal device. The apparatus may include a processing unit and a transceiver unit. When the apparatus is a communication device, the processing unit may be a processor, and the transceiver unit may be a transceiver. The apparatus may further include a storage module, and the storage module may be a memory. The storage module is configured to store instructions, and the processing unit executes the instructions stored in the storage module, so that the terminal device performs a corresponding function in the third aspect or any possible design of the third aspect. When the apparatus is the chip or the chipset in the communication device, the processing unit may be a processor, and the transceiver unit may be an input/output interface, a pin, a circuit, or the like. The processing unit executes the instructions stored in the storage module, so that the terminal device performs a corresponding function in the third aspect or any possible design of the third aspect. The storage module may be a storage module (for example, a register or a cache) in the chip or chipset, or may be a storage module outside the chip or chipset in the terminal device (for example, a read-only memory and a random access memory).

When performing an action performed by the second communication apparatus in the second aspect, the processing unit may be configured to determine a first norm. The first norm is the norm of the gradient of the first learning model of the first communication apparatus. The processing unit may also be configured to determine a modulation and coding scheme based on the first norm. The modulation and coding scheme is for processing information about the first learning model of the first communication apparatus, the information about the first learning model is for determining a second learning model, and the second learning model is configured to update the first learning model of the first communication apparatus. The transceiver unit may also be configured to send first information to the second communication apparatus, where the first information indicates the modulation and coding scheme.

In a possible design, the processing unit may further be configured to determine a modulation and coding scheme that maximizes training efficiency of a second learning model. The training efficiency is related to a reduced value of a loss function of an $N^{th}$ round of training of the second learning model and a first delay of the $N^{th}$ round of training of the second learning model, the reduced value of the loss function and the first delay are determined based on the first norms and the modulation and coding schemes, and N is a positive integer greater than or equal to 1.

In a possible design, the reduced value of the loss function is determined based on a gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme. The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

According to an eighth aspect, this application provides a communication apparatus. The apparatus may be a communication device, or may be a chip or a chipset in the communication device. The communication device may be a network device. The apparatus may include a processing unit and a transceiver unit. When the apparatus is a communication device, the processing unit may be a processor, and the transceiver unit may be a transceiver. The apparatus may further include a storage module, and the storage module may be a memory. The storage module is configured to store instructions, and the processing unit executes the instructions stored in the storage module, so that the network device performs a corresponding function in the fourth aspect or any possible design of the fourth aspect. When the apparatus is the chip or the chipset in the communication device, the processing unit may be a processor, and the transceiver unit may be an input/output interface, a pin, a circuit, or the like. The processing unit executes the instructions stored in the storage module, so that the network device performs a corresponding function in the fourth aspect or any possible design of the second aspect. The storage module may be a storage module (for example, a register or a cache) in the chip or chipset, or may be a storage module outside the chip or chipset in the network device (for example, a read-only memory and a random access memory).

When performing an action performed by a second communication apparatus in the fourth aspect, the transceiver unit may be configured to obtain first information from a first communication apparatus. The first information indicates a modulation and coding scheme, the modulation and coding scheme is determined based on a first norm of the first communication apparatus, and the first norm is the norm of the gradient of the first learning model of the first communication apparatus. The processing unit may be configured to process, based on the modulation and coding scheme, information from the first communication apparatus to obtain information about the first learning model of the first communication apparatus. The information about the first learning model is for determining a second learning model, and the second learning model is configured to update the first learning model of the first communication apparatus.

According to a ninth aspect, embodiments of this application provide a communication apparatus. The apparatus includes a communication interface and a processor. The communication interface is used for the apparatus to perform communications, for example, sending and receiving data or signals. The communication interface may be a transceiver, a circuit, a bus, a module, or another type of interface. The processor is configured to invoke a group of programs, instructions, or data, to perform the method described in any possible design of the first aspect to the fourth aspect. The apparatus may further include a memory, configured to store the program, instructions, or data invoked by the processor. The memory is coupled to the processor, and when executing the instructions, or data stored in the memory, the processor may implement the method described in any possible design of the first aspect to the fourth aspect.

According to a tenth aspect, embodiments of this application provide a communication system. The system may include a communication apparatus configured to implement the first aspect or any possible design of the first aspect, and the communication apparatus is configured to implement the second aspect or any possible design of the second aspect. Alternatively, the system may include a communication apparatus configured to implement the third aspect or any possible design of the third aspect, and a communication apparatus configured to implement the fourth aspect or any possible design of the fourth aspect.

According to an eleventh aspect, embodiments of this application further provide a computer-readable storage medium. The computer-readable storage medium stores computer-readable instructions. When the computer-readable instructions are run on a communication apparatus, the method according to the first aspect to the fourth aspect or any possible design of the first aspect to the fourth aspect is performed.

According to a twelfth aspect, embodiments of this application provide a chip system. The chip system includes a processor, and may further include a memory, configured to implement the method in the first aspect to the fourth aspect, or any possible design of the first aspect to the fourth aspect. The chip system may include a chip, or may include a chip and another discrete component.

According to a thirteenth aspect, embodiments of this application provide a communication system. The system includes a terminal device and an access network device. The terminal device is configured to perform the method in the first aspect or any possible design of the first aspect, or the third aspect or any possible design of the third aspect. The access network device is configured to perform the method in the second aspect or any possible design of the second aspect, or the fourth aspect or any possible design of the fourth aspect.

According to a fourteenth aspect, a computer program product including instructions is provided. When the computer program product is run on a communication apparatus, the method according to the first aspect to the fourth aspect, or any possible design of the first aspect to the fourth aspect is performed.

According to a fifteenth aspect, embodiments of this application provide a communication apparatus. The communication apparatus includes a processor. When the processor executes a computer program or instructions in a memory, the method according to the first aspect to the fourth aspect, or any possible design of the first aspect to the fourth aspect is performed.

According to a sixteenth aspect, embodiments of this application provide a communication apparatus. The communication apparatus includes a processor and a memory. The memory is configured to store a computer-executable computer program or instructions executed by a computer. The processor is configured to execute the computer-executable computer program or instructions stored in the memory, so that the communication apparatus performs a corresponding method shown in the first aspect to the fourth aspect, or any possible design of the first aspect to the fourth aspect.

According to a seventeenth aspect, embodiments of this application provide a communication apparatus. The communication apparatus includes a processor, a memory, and a transceiver. The transceiver is configured to receive a signal or send a signal. The memory is configured to store program code or instructions. The processor is configured to invoke the program code or the instructions from the memory to perform the method according to the first aspect to the fourth aspect, or any possible design of the first aspect to the fourth aspect.

According to an eighteenth aspect, embodiments of this application provide a communication apparatus. The communication apparatus includes a processor and an interface circuit. The interface circuit is configured to receive computer program code or instructions and transmit the computer program code or the instructions to the processor. The processor runs the computer program code or the instructions to perform a corresponding method shown in the first aspect to the fourth aspect, or any possible design of the first aspect to the fourth aspect.

According to a nineteenth aspect, embodiments of this application provide a communication apparatus. For example, the communication apparatus may be a chip. The communication apparatus includes: a logic circuit and an input/output interface. The input/output interface is used for the apparatus to communicate with another device, for example, input configuration information. The logic circuit is configured to run computer program code or instructions to perform corresponding method according to the first aspect to the fourth aspect, or any possible design of the first aspect to the fourth aspect.

For technical effects brought by any implementation of the fifth aspect to the nineteenth aspect, refer to the beneficial effects in a corresponding method provided above. Details are not described herein again.

DESCRIPTION OF EMBODIMENTS

To make the objectives, technical solutions, and advantages of embodiments of this application clearer, the following further describes embodiments of this application in detail with reference to the accompanying drawings.

Figure 1:
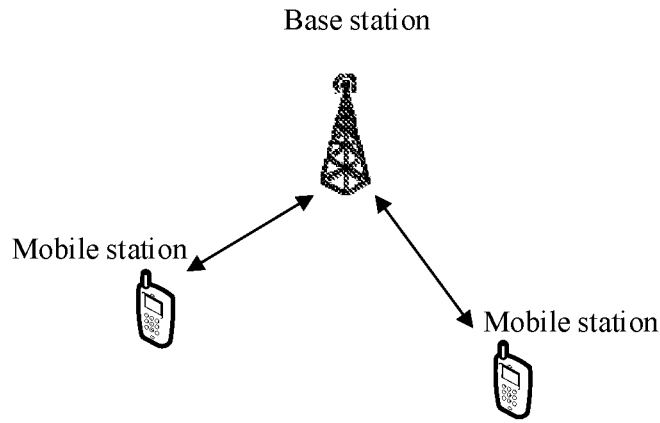
FIG. 1 is a schematic diagram of an architecture of a communication system according to an embodiment of this application.

The communication method provided in this application may be applied to a wireless federated learning scenario in various wireless communication architectures. As shown in FIG. 1, a wireless communication system generally includes cells. Each cell may include a base station (BS), and the base station provides a communication service for one or more mobile stations (MSs). The base station may include a baseband unit (BBU) and a remote radio unit (RRU). The BBU and RRU may be placed in different places. For example: the RRUs are placed remotely in areas with heavy traffic, and the BBUs are placed in a central equipment room. The BBU and RRU may alternatively be placed in a same equipment room. The BBU and the RRU may alternatively be different components in a same rack.

It should be noted that a wireless communication system mentioned in the solution of some embodiments of the invention includes but is not limited to: a narrow band Internet of Things system (NB-IoT), a global system for mobile communications (GSM), an enhanced data rate for GSM evolution system (EDGE), a wideband code division multiple access system (WCDMA), a code division multiple access 2000 system (CDMA2000), a time division synchronous code division multiple access system (TD-SCDMA), device-to-device (D2D), vehicle-to-everything (V2X), a machine-to-machine (M2M) communication system, a long term evolution system (LTE), and a next-generation 5G mobile communication system, for example, enhanced mobile broadband (eMBB), ultra-reliable low latency communication (URLLC), and enhanced machine-type communication (eMTC).

Embodiments of this application are not only applicable to communication between an MS and a base station, but also applicable to communication between base stations, communication between terminal devices, Internet of Vehicles, Internet of Things, industrial Internet, satellite communication, and the like.

Figure 2:
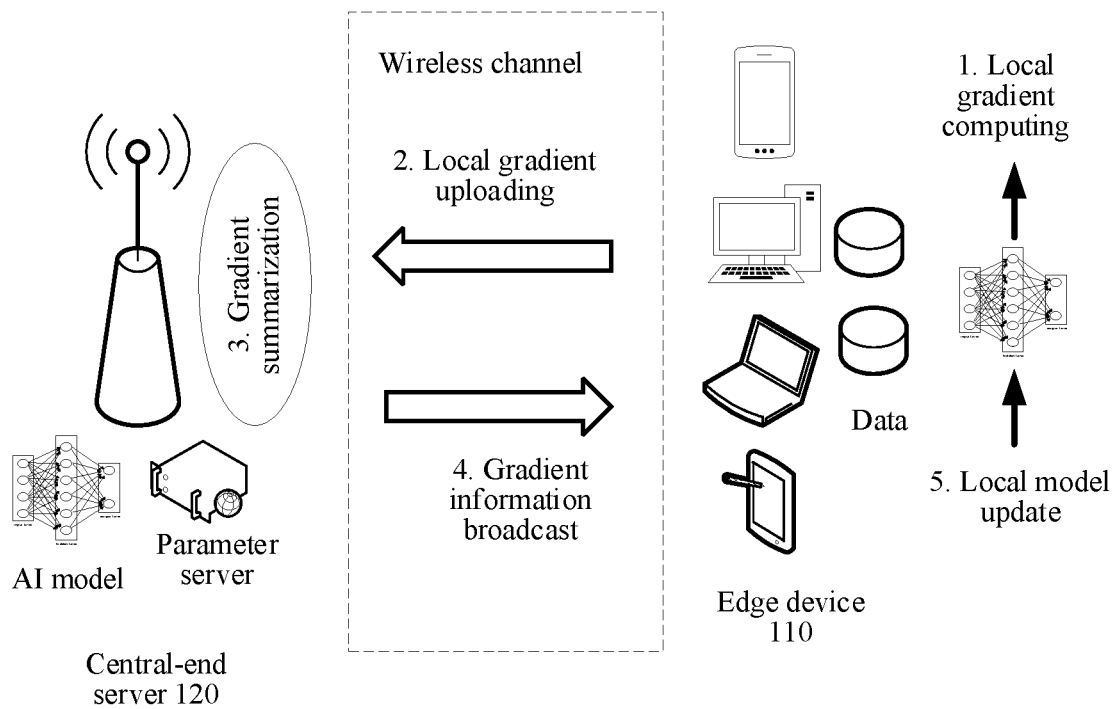
FIG. 2 is a schematic diagram of an architecture of federated learning according to an embodiment of this application.

For ease of understanding, the following describes a federated learning scenario and process as an example with reference to FIG. 2.

Referring to FIG. 2, a federated learning scenario may include a plurality of edge devices 110 and a central-end server 120. The edge device 110 is a participant in a federated learning process, and is also an owner of data or a dataset (also referred to as a local dataset). The central-end server 120 is a coordinator of the federated learning process. If the edge device 110 communicates with the central-end server 120 through a wireless network, a federated learning scenario of this type may be referred to as a wireless federated learning scenario.

The central-end server 120 may be configured to maintain a federated learning model, that is, a global model. The edge device 110 may obtain the federated learning model from the central-end server 120, and perform local training with reference to the local dataset to obtain a local model. The local model may correspond to a local training result. For example, the local training result includes a parameter of the local model and/or a gradient of the local model. After the local model is obtained through training, the edge device 110 may send the local training result to the central-end server 120, so that the central-end server 120 updates or optimizes the federated learning model. In this way, multiple iterations are performed until the federated learning model converges or a preset iteration stop condition is reached (for example, a maximum number of rounds of training or a maximum training time is reached).

It should be understood that the central-end server 120 and the edge device 110 may be any node (for example, a network node) that supports data transmission. For example, the edge device 110 may be a client, such as a mobile terminal, an edge node, or a personal computer, and can support communication with an access network device (such as a base station). The central-end server 120 may be a server, also referred to as a parameter server or an aggregation server. The central-end server 120 may be independent of a network device but support communication with the network device, or may be integrated with the network device. The network device is, for example, an access network device, such as a base station. Therefore, the central-end server 120 may communicate with the edge device 110 through a wireless network.

For example, the edge device 110 may be an MS, or a device or apparatus that supports wireless communication through the MS.

The MS involved in the solutions of some embodiments of the invention may include various handheld devices, in-vehicle devices, wearable devices, computing devices, or other processing devices connected to a wireless modem that have a wireless communication function. The MS may also be referred to as a terminal, and the MS may alternatively be a subscriber unit, a cellular phone, a smartphone, a wireless data card, or a personal digital assistant (PDA) computer, a tablet computer, a wireless modem, a handset, a laptop computer, a machine type communication (MTC) terminal, and the like. The MS may alternatively be a vehicle or terminal-type roadside unit, or a transceiver unit or chip built into the vehicle or a roadside unit.

As an example instead of a limitation, in some embodiments of this application, the MS may alternatively be a wearable device. The wearable device may also be referred to as a wearable intelligent device, an intelligent wearable device, or the like, and is a general term for a wearable device, such as glasses, gloves, watches, clothing, and shoes, that is intelligently designed for daily wear. The wearable device is a portable device that is directly worn on a body, or integrated into clothes or accessories of a user. Wearable devices are not only hardware devices, but also implement powerful functions through software support, data exchange, and cloud interaction. In a broad sense, a wearable intelligent device can implement all or some functions without depending on a smartphone. For example, smartwatches or smart glasses, and other devices that only focus on a specific type of application function, need to be used with other devices such as smartphones (other examples include various smart bands, smart helmets, and smart jewelry for physical sign monitoring).

If the various MSs described above are located on a vehicle (for example, placed in a vehicle or mounted in a vehicle), they may be considered as an in-vehicle device. The in-vehicle device may also be referred to as an on-board unit (OBU).

In some embodiments of this application, an apparatus for implementing a function of the MS is, for example, a chip, a radio transceiver, or a chip system. The apparatus may be mounted, or set up, or deployed in the MS.

For example, the central-end server 120 may be a server with a data processing capability, for example, a server that supports machine learning. The central-end server 120 may perform wireless communication with the edge device 110 through the network device. Therefore, the central-end server 120 may obtain a local training result of the edge device 110 through the wireless network, and send the global model to the edge device 110.

The central-end server 120 may be integrated with a server and a network device, or may be physically disposed separately from the network device. This is not specifically limited herein. The network device includes, for example, an access network (AN) device, such as a base station (for example, an access point). The base station is an apparatus that is deployed in a radio access network and that provides a wireless communication function for the MS. The base station may include a macro base station, a micro base station (also referred to as a small cell), a relay station, an access point, or the like in various forms. In systems that use different radio access technologies, names of devices that have a base station function may be different. For example, in an LTE system, devices that have a base station function are referred to as evolved NodeB (eNB or eNodeB), and in a 3rd generation (3G) system, devices that have a base station function are referred to as NodeB. For ease of description, in embodiments of this application, the foregoing apparatuses that provide a wireless communication function for the MS are collectively referred to as a network device, a base station, or a BS.

For example, in this application, an example in which the edge device 110 shown in FIG. 2 is used as the MS, and the central-end server 120 is used as the base station (or the central-end server 120 is connected to the base station) is used for description. In some possible application scenarios, the edge device 110 may be used as the base station (or the edge device 110 is connected to the base station), and/or the central-end server 120 may be used as the MS.

The following describes a federated learning process. An example in which a central-end server supports wireless communication with the edge device is used for description herein. The federated learning is performed based on a federated averaging (federated averaging, FedAvg) algorithm, and may include the following steps.

S101: In a $t^{th}$ round of training, the $k^{th}$ edge device performs E epochs of training on the global model $w_g^{t-1}$ from the central-end server based on the local dataset $D_k$, to obtain a local training result $w_k^t$, $t \in [1,T]$, $k \in [1,K]$, and T is a quantity of training rounds, and K is a total quantity of edge devices.

S102: The central-end server performs weighted averaging with a quantity of samples of the edge devices as weights, to obtain a new global model. An update rule may be $$w_g^t = \Sigma_{k \in S^t} \frac{D_k w_k^t}{\Sigma_{k \in S^t} D_k},$$

and $S^t$ is a set of edge devices participating in the $t^{th}$ round of training.

S103: The central-end server broadcasts the new global model to all edge devices.

S104: The edge device updates the global model. So far, the $t^{th}$ round of training is completed.

Then, S101 to S104 may be repeatedly performed until the global model obtained through updating converges or a number of rounds of training reaches T. Each time S101 to S104 are repeatedly performed, one round of training is performed.

When federated learning is implemented based on the foregoing wireless communication network architecture, uploading of the local training result and broadcasting of the global model are performed through a radio channel, causing the following problems.

Due to limited bandwidth of a radio channel and unreliable transmission, a channel bit error occurs when the edge device uploads a gradient update. As a result, a received gradient update is incorrect, convergence of federated learning model training is affected, and a training delay is increased. In addition, because the edge device generally has a problem of insufficient computing capability compared with the central-end server, a computing delay of a local training process described in S101 cannot be ignored in each round of training. In addition, limited radio channel resources cause relatively large communication overheads, so that a transmission delay of uploading the local training result by the edge device is relatively large.

Based on the foregoing problems, a training delay of wireless federated learning is far greater than a training delay of traditional federated learning, and therefore it is necessary to optimize the training delay of the wireless federated learning.

Figure 3:
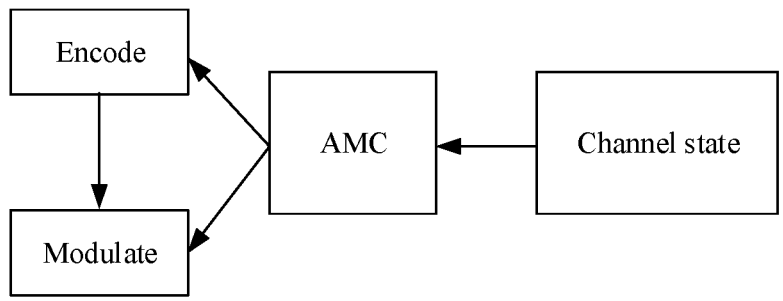
FIG. 3 is a schematic diagram of selection logic of a modulation and coding scheme according to an embodiment of this application.

In wireless communications, a selection of a channel modulation and coding scheme will affect both the channel bit error and transmission delay. A manner of determining the modulation and coding scheme in an existing wireless communication system is described herein. As shown in FIG. 3, in an existing communication system, a modulation and coding scheme, such as adaptive modulation and coding (AMC), is generally selected based on channel state information. A cellular network such as LTE and New Radio (NR) is used as an example here. In downlink communication, an MS performs channel state measurement by using a reference signal sent by a base station, and feeds back a channel state (also referred to as channel quality) to the base station by using a channel quality indicator (CQI). The base station determines a modulation and coding scheme (MCS) level with reference to the CQI. The MCS level corresponds to a modulation and coding scheme, and the MCS level is sent to the MS by using downlink control information (DCI), to indicate an MCS level that the MS needs to use. In uplink communication, the base station directly performs channel state measurement by using a reference signal sent by the MS, determines an MCS level, and sends the MCS level to the MS by using DCI. When a channel state changes during the foregoing channel measurement, the base station adaptively modulates the MCS level. For example, when a channel state becomes poor, the base station lowers the MCS level, reduces throughput on a communication link, avoids an increase of a bit error rate, and ensures correct receiving and demodulation of communication information. When a channel state becomes better, the base station increases the MCS level to increase throughput of the communication link.

When applied to the wireless federated learning scenario, selecting a modulation and coding scheme with a small channel bit error can ensure convergence of global model training, that is, the model is optimal after a small number of iteration training. However, this inevitably leads to a relatively small transmission rate. As a result, a transmission delay is greatly increased, and a time of each round of training is relatively prolonged. Therefore, even if a quantity of iterations of model training is relatively small, it still takes a long time to complete model training, and a model training framework with optimal performance cannot be obtained.

Therefore, to optimize the training delay of wireless federated learning, in each round of training interaction, each edge device needs to select a channel modulation and coding scheme, and make a trade-off between model convergence and transmission delay, to obtain the optimal model training framework. However, how to adaptively select the modulation and coding scheme in a proper manner to optimize the training delay and improve a convergence rate has become an urgent problem to be resolved.

To resolve this problem, an embodiment of this application provides a communication method. The communication method may be performed by a first communication apparatus and/or a second communication apparatus. The first communication apparatus may be configured to implement a function of an edge device. For example, the first communication apparatus may be an edge device, or may be an apparatus configured to implement the edge device, such as a chip, a chip system, a transceiver, and/or a memory. The second communication apparatus may be configured to implement a function of a central-end server. For example, the second communication apparatus may be a central-end server, or may be an apparatus configured to implement the central-end server, such as a chip, a chip system, a transceiver, and/or a memory.

Figure 4:
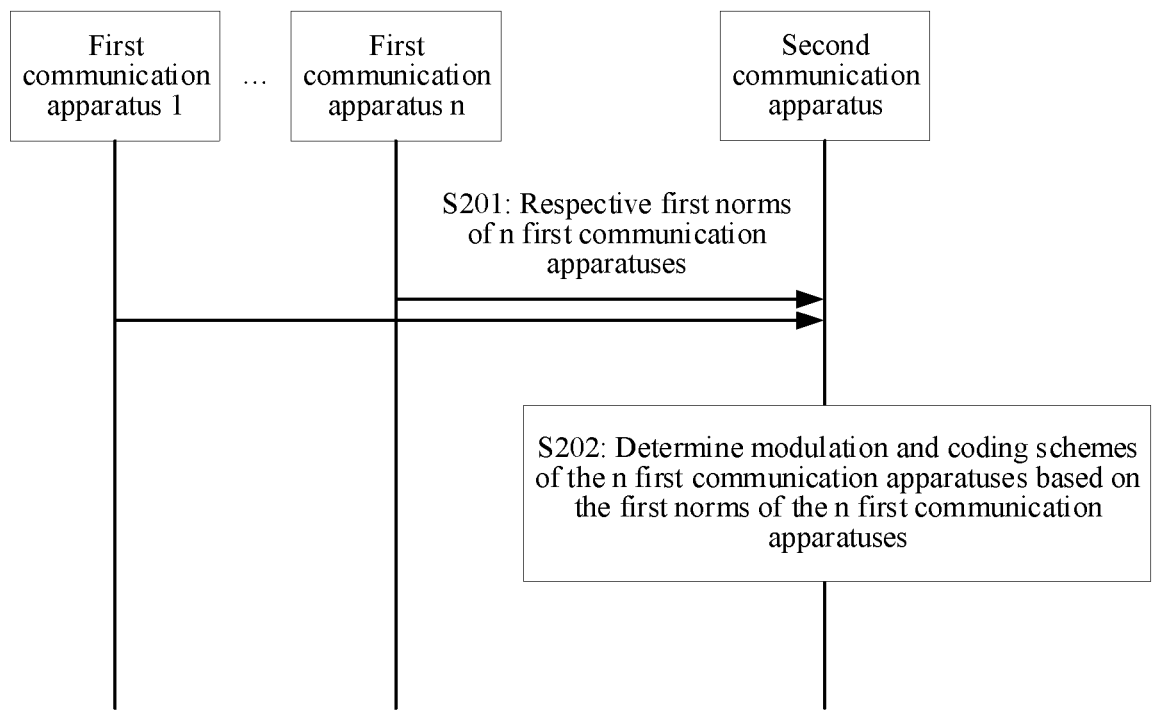
FIG. 4 is a schematic flowchart of a communication method according to an embodiment of this application.

As shown in FIG. 4, the communication method provided in some embodiments of this application may include the following steps.

S201: n first communication apparatuses each send respective first norms, where a first norm is a norm of a gradient of a first learning model of the first communication apparatus.

n≤K, and K is a quantity of first communication apparatuses participating in wireless federated learning. K is a positive integer greater than or equal to 1. It should be understood that, for ease of description, FIG. 4 shows a plurality of first communication apparatuses, that is, a first communication apparatus 1 and a first communication apparatus n, but it does not indicate that there are a plurality of first communication apparatuses. In other words, when n is equal to 1, the first communication apparatus 1 and the first communication apparatus n shown in FIG. 4 represent the same first communication apparatus.

It should be understood that the first learning model of the first communication apparatus may be a local model obtained after the first communication apparatus trains a global model based on a local dataset. The global model may come from a second communication apparatus.

A process of determining the first norm is described herein by using an example.

Before S201, the n first communication apparatuses each receive a global model from the second communication apparatus. The n first communication apparatuses each train a global model based on the respective local datasets of the n first communication apparatuses, to obtain respective first learning models that meet a local training condition, obtain gradients of the respective first learning models, and further obtain norms of the gradients of the respective first learning models, that is, the first norms.

A gradient of the first learning model is a gradient transferred backward when the first learning model is trained based on local data. For example, during supervised learning, a loss function is obtained through calculation, based on an inference result determined by using a learning model to process local data and a label of the local data. Then the loss function is derived for a parameter of the learning model to obtain the gradient. It should be noted that this is merely an example of one gradient calculation method. Embodiments of the present application can utilize another gradient obtaining method in a learning model training process.

Correspondingly, the second communication apparatus obtains first norms of the n first communication apparatuses. A first norm of an $i^{th}$ first communication apparatus is a norm of a gradient of a first learning model of the $i^{th}$ first communication apparatus, where i=1, 2, ..., n, and n is a positive integer.

S202: The second communication apparatus determines the modulation and coding schemes of the n first communication apparatuses based on the first norms of the n first communication apparatuses.

The second communication apparatus may determine a modulation and coding scheme of each first communication apparatus.

For example, the second communication apparatus may determine the modulation and coding schemes of the n first communication apparatuses based on respective first norms, computing capability information, and channel states of the n first communication apparatuses.

The computing capability information of the first communication apparatus may be separately sent by the first communication apparatus to the second communication apparatus. The channel state of the first communication apparatus may be obtained by the second communication apparatus through channel measurement.

A modulation and coding scheme of the $i^{th}$ first communication apparatus is for processing information about the first learning model of the $i^{th}$ first communication apparatus, the information about the first learning model of the $i^{th}$ first communication apparatus is for determining a second learning model, and the second learning model is configured to update first learning models of the n first communication apparatuses.

Optionally, the second communication apparatus may send first information, and the first information may indicate modulation and coding schemes of the n first communication apparatuses.

The first information may be sent in a unicast, multicast, or broadcast manner. If the unicast manner is used for sending, the second communication apparatus may send the first information for any first communication apparatus. The first information may indicate a modulation and coding scheme of the first communication apparatus. If the multicast or broadcast manner is used for sending, the second communication apparatus adds, to one multicast or broadcast message, respective modulation and coding schemes of a plurality of first communication apparatuses.

Correspondingly, the n first communication apparatuses may receive the first information, that is, obtain the modulation and coding scheme.

It should be understood that any first communication apparatus may perform the following steps based on a modulation and coding scheme of the first communication apparatus: modulating and encoding information about the first learning model of the first communication apparatus based on the modulation and coding scheme, and send modulated and encoded information about the first learning model to a second terminal apparatus. After receiving the information sent by the $i^{th}$ first communication apparatus through the radio link, the second terminal apparatus demodulates and decodes the information based on the modulation and coding scheme of the $i^{th}$ first communication apparatus, to obtain the information about the first learning model of the $i^{th}$ first communication apparatus. After receiving the information about the respective first learning models of the n first communication apparatuses, the second communication apparatus may fuse the information about the respective first learning models of the n first communication apparatuses, to obtain an updated global model.

For example, the information about the first learning model includes a parameter and/or gradient information of the first learning model, and is used for obtaining the second learning model through fusion. The second learning model is the global model. Subsequently, the second communication apparatus may send the second learning model to the first communication apparatus, and the first communication apparatus updates the local training model based on the second learning model, and performs subsequent local training. A manner of obtaining the second learning model through fusion includes but is not limited to: the second communication apparatus performs fusion on information about the respective first learning models of the n first communication apparatuses to obtain the second learning model. The fusion manner is shown in S102.

By using the foregoing method, the second communication apparatus may determine a modulation and coding scheme based on the first norms of the first communication apparatuses, and the first communication apparatuses upload the information about the first learning model based on the modulation and coding scheme. The first norm of the first communication apparatus represents an importance degree of a local dataset of the first communication apparatus, and the modulation and coding scheme used when a local training result is uploaded is determined based on the first norm, so that efficiency of federated learning can be improved.

The following describes a manner of determining a modulation and coding scheme with reference to an embodiment.

In S202, the second communication apparatus may determine a modulation and coding scheme that maximizes training efficiency of the second learning model. The training efficiency of the second learning model describes a speed of training the second learning model. For example, the training efficiency of the second learning model is related to a reduced value of a loss function of an $N^{th}$ round of training of the second learning model and a first delay of the $N^{th}$ round of training of the second learning model. The reduced value of the loss function and the first delay are related to the first norms of the n first terminal apparatuses and the modulation and coding schemes of the n first terminal apparatuses, and N is a positive integer greater than or equal to 1.

Optionally, the reduced value of the loss function is determined based on the gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme.

The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

A manner of determining training efficiency P of the second learning model is described herein by using an example in which N is equal to 1 and n is a positive integer greater than or equal to 2.

The training efficiency P meets:

$$P = \frac{\Delta L}{T}. \qquad \text{(Formula 1)}$$

$\Delta L$ is a reduced value of a loss function for performing a round of training on the second learning model, that is, a convergence rate for performing a round of training. T is a first delay, that is, a delay required for performing training on the second learning model in any round of training.

Optionally, $\Delta L$ meets:

$$\Delta L = \frac{1}{2l}\|g^t\|^2 - \frac{1}{2l}\{\|g^t - \widehat{g^t}\|^2\}. \qquad \text{(Formula 2)}$$

t is a current training round, l is a training learning rate of the second learning model, $$\|g^t\|^2 = \sum_{k=1}^{n}\|g_k^t\|^2$$

is a square of a norm of a theoretical global gradient of the second learning model, and $E\{\|g^t - \widehat{g^t}\|^2\}$
is a mean deviation of a global gradient caused by a channel bit error.

Optionally, $E\{\|g^t - \widehat{g^t}\|^2\}$ meets:

$$E\{\|g^t - \widehat{g^t}\|^2\} \leq \sum_{k=1}^{n} S\|g_k^t\|^2\left(\epsilon_k^t(q_k^t)^2 + \zeta_k^t(q_k^t)\right).$$

That is, the upper bound of $E\{\|g^t - \widehat{g^t}\|^2\}$ is $$\sum_{k=1}^{n} S\|g_k^t\|^2\left(\epsilon_k^t(q_k^t)^2 + \zeta_k^t(q_k^t)\right). \qquad \text{(Formula 3)}$$

$\|g_k^t\|$ is a first norm of a $k^{th}$ first communication apparatus, S is a quantity of parameters in the first learning model, q is a bit error rate of the $k^{th}$ first communication apparatus, $q_k^t$ is related to channel state information and modulation and coding parameters of the $k^{th}$ first apparatus, and $\epsilon_k^t$ and $\zeta_k^t$ are separately parameters related to the first learning model of the $k^{th}$ first communication apparatus, where k=1, 2, ..., n.

A manner of determining q is described herein. A modulation order $M_k$ and a coding bit rate (or a bit rate for short) $c_k$ greatly affect an uplink transmission rate. That is, a larger $M_k$ and a larger $c_k$ indicate a larger uplink transmission rate and a smaller transmission delay, so that a smaller single training delay can be obtained. However, when a channel signal-to-noise ratio (SNR) is the same, $M_k$ is larger, $c_k$ is larger, a channel bit error rate $q_k^t$ is also larger, and a larger gradient data deviation is caused, thereby affecting a reduction of a loss function of a single training and correctness of a model.

Therefore, it is assumed that the bit error rate is a function related to the signal-to-noise ratio, modulation order, and bit rate:

$$q_k^t = f(SNR_k, M_k, c_k).$$

The function f may be obtained through simulation, that is, given $M_k$ and $c_k$, bit error rates under different $SNR_k$ are obtained through simulation, and the function f is obtained through curve fitting. Therefore, for the $t^{th}$ round of training, the bit error rate $q_k^t$ of the $k^{th}$ first communication apparatus may be determined based on the function f, $SNR_k$ of the $k^{th}$ first communication apparatus, the modulation order $M_k$ of the $k^{th}$ first communication apparatus, and the channel coding bit rate $c_k$ of the $k^{th}$ first communication apparatus. The second communication apparatus may obtain $SNR_k$ of the $k^{th}$ first communication apparatus through a channel estimation process.

Optionally, T in Formula 1 can meet:

$$T = T_B + \max\{T_k^C + T_k^U\}. \qquad \text{(Formula 4)}$$

$T^B$ is a second delay of sending, by the second communication apparatus, the parameter of the second learning model to the first communication apparatus. $T_k^C$ is a delay required by the $k^{th}$ first communication apparatus to obtain the first learning model of the first communication apparatus, that is, a third delay of the $k^{th}$ first communication apparatus. $T_k^U$ is a delay required by the $k^{th}$ first communication apparatus to send information about the first learning model of the $k^{th}$ first communication apparatus to the second communication apparatus, that is, a fourth delay of the $k^{th}$ first communication apparatus. max { } indicates that a maximum value of $\{T_1^C + T_1^U, T_2^C + T_2^U, \ldots, T_n^C + T_n^U\}$ is selected.

For example, $T^B$ can meet:

$$T^B = \frac{S \times 4d}{\gamma^D}.$$

S is a quantity of parameters in the first learning model, 4d is a quantization bit number, and $\gamma^D$ indicates a sending rate of sending, by the second communication apparatus, to the first communication apparatus. For example, if the second communication apparatus is a base station, and the first communication apparatus is an MS, $\gamma^D$ is a downlink transmission rate.

Optionally, the third delay of the $k^{th}$ first communication apparatus is determined based on computing capability information of the $k^{th}$ first communication apparatus. The n first communication apparatuses may send computing capability information of the n first communication apparatuses to the second communication apparatus. The computing capability of the first communication apparatus is, for example, a central processing unit (CPU) frequency of the first communication apparatus, and the computing capability information is, for example, a value of the CPU frequency. For example, $T_k^C$ meets:

$$T_k^C = \frac{D_k C^L}{f_k^C}.$$

$D_k$ represents a data volume of the $k^{th}$ first communication apparatus participating in training, that is, a data volume in the local dataset. $C^L$ represents a number of running rounds required by a CPU for forward-backward calculation of a piece of data, and $f_k^C$ represents a CPU frequency of a terminal.

In addition, the fourth delay of the $k^{th}$ first communication apparatus may be determined based on a modulation and coding scheme of the $k^{th}$ first communication apparatus. The modulation and coding scheme of the first communication apparatus may include a modulation order and a coding bit rate. For example, $T_k^U$ meets:

$$T_k^U = \frac{S \times 4d}{\gamma_k^U}.$$

S is a quantity of parameters in the first learning model, 4d is a quantization bit number, and $\gamma_k^U$ represents an upload rate of the first communication apparatus. $\gamma_k^U$ is related to the modulation and coding scheme and the channel state. When multiple phase shift keying (MPSK) or multiple quadrature amplitude modulation (MQAM) is used, $\gamma_k^U$ may meet:

$$\gamma_k^U = 0.5 c_k B_k \log_2(M_k).$$

$B_k$ represents an available channel bandwidth of the first communication apparatus, $M_k$ represents a modulation order of the $k^{th}$ first communication apparatus, and $c_k$ represents a channel coding bit rate of the $k^{th}$ first communication apparatus.

It can be learned from Formula 1 to Formula 4 that P meets:

$$P = \frac{\Delta L}{T} = \frac{\frac{1}{2l}\|g^t\|^2 - \frac{1}{2l}\{\|g^t - \hat{g}_t\|^2\}}{T^B + \max\{T_k^C + T_k^U\}} \geq \frac{\sum_{k=1}^n \|g_k^t\|^2 \left(1 - S(\epsilon_k^t(q_k^t)^2 + \zeta_k^t q_k^t)\right)}{2lT}. \qquad \text{(Formula 5)}$$

Optionally, based on Formula 5, a problem in which the training efficiency P is maximized may be described as P1, and the problem P1 is described as:

P1: max P, which is subject to:

$q_k^t \leq q^{max}$;

$M = 2^m$, $m = 1, 2, \ldots, M_{max}$; and $0 \leq c < c_{max}$.

$q^{max}$ is a maximum channel bit error rate allowed by the wireless communication system, $M_{max}$ is a maximum modulation order allowed by the wireless communication system, and $c_{max}$ is a maximum bit rate at which the wireless communication system operates.

For ease of solution, a problem in which the training efficiency P is maximized may be converted into a problem in which a lower bound of the training efficiency P is maximized, that is, a problem P2 is to be solved, where the problem P2 is described as:

$$P2: \max \frac{\sum_{k=1}^{n} \|g_k^t\|^2 (1 - S(\epsilon_k^t (q_k^t)^2 + \zeta_k^t q_k^t))}{2lT},$$

which is subject to:

$q_k^t \leq q^{max}$;

$M = 2^m$, $m = 1, 2, \ldots, M_{max}$; and $0 \leq c < c_{max}$.

The modulation and coding scheme of the $k^{th}$ first communication apparatus may be obtained by resolving the problem P2. To solve P2, the bit rate may be discretized into a plurality of values: $c_1, c_2, c_3, \ldots, c_{max}$, so that the problem is converted into an optimization problem at discrete points, and solved by using an enumeration method, to obtain a modulation and coding scheme of each first communication apparatus in a current round.

It should be understood that the solution of P2 is performed by the plurality of first communication apparatuses that participate in federated learning, and therefore it is a globally optimal solution for the $k^{th}$ first communication apparatus.

In another example, when n is equal to 1, the second communication apparatus determines the modulation and coding scheme of the first communication apparatus based on the first norm of the $k^{th}$ first communication apparatus in the plurality of first communication apparatuses participating in federated learning. The $k^{th}$ first communication apparatus sends the information about the first learning model to the second communication apparatus based on the modulation and coding scheme.

When determining the modulation and coding scheme of the first communication apparatus, the second communication apparatus may determine a modulation and coding scheme that maximizes the training efficiency. Similar to a manner of determining the training efficiency when n is a positive integer greater than or equal to 2, when n is equal to 1, a problem of solving the modulation and coding scheme that maximizes the training efficiency may be converted into a problem P3. The problem P3 may be described as:

$$P3: \max \frac{1}{2l} \frac{\|g_k^t\|^2 (1 - S(\epsilon_k^t (q_k^t)^2 + \zeta_k^t q_k^t))}{T^B + T_k^C + T_k^U}, \quad \text{(Formula 6)}$$

which is subject to:

$q_k^t \leq q^{max}$;

$M = 2^m$, $m = 1, 2, \ldots, M_{max}$; and $0 \leq c < c_{max}$.

$\|g_k^t\|$ is the first norm of the $k^{th}$ first communication apparatus, l is the training learning rate of the second learning model, S is the quantity of parameters in the first learning model, $q_k^t$ is the bit error rate of the $k^{th}$ first communication apparatus, $q_k^t$ is related to the channel state information and the modulation and coding parameter of the $k^{th}$ first apparatus, $\epsilon_k^t$ and $\zeta_k^t$ are parameters related to the first learning model of the $k^{th}$ first communication apparatus, $T^B$ is the second delay of sending, by the second communication apparatus, the parameter of the second learning model to the first communication apparatus, $T_k^C$ is the delay required by the $k^{th}$ first communication apparatus to obtain the first learning model of the first communication apparatus, that is, the third delay of the $k^{th}$ first communication apparatus; and $T_k^U$ is the delay required by the $k^{th}$ first communication apparatus to send the information about the first learning model of the $k^{th}$ first communication apparatus to the second communication apparatus, that is, the fourth delay of the $k^{th}$ first communication apparatus.

For manners of determining parameters such as $q_k^t$, $T^B$, $T_k^C$, and $T_k^U$ in Formula 6, refer to descriptions of manners of determining corresponding symbols in Formula 1 to Formula 5.

$q^{max}$ is the maximum channel bit error rate allowed by the wireless communication system, $M_{max}$ is the maximum modulation order allowed by the wireless communication system, and $c_{max}$ is the maximum bit rate at which the wireless communication system operates. Problem 3 may be solved by using an enumeration method, to obtain a modulation and coding scheme for the $k^{th}$ first communication apparatus in the current round.

The solution of problem P3 is specific to each first communication apparatus, and is independent of computing capability information, channel states, and modulation and coding schemes of other first communication apparatuses.

Optionally, the first communication apparatus and/or the second communication apparatus may further store optimal solutions of the modulation and coding schemes of the foregoing problems P2 and/or P3 with different signal-to-noise ratios, computing capabilities, and first norms. That is, a modulation and coding scheme indication table for determining and/or indicating the modulation and coding scheme is stored, to determine the modulation and coding scheme.

The following uses solving the problem P2 as an example for description.

As shown in Table 1, an optimal solution of the problem P2 with a value of each SNR, a value of each computing capability, and a value of each first norm can be determined by using an offline manner between the first communication apparatus and the second communication apparatus for an SNR range, computing capability range, and first norm range. That is, the modulation and coding scheme is determined and stored as a corresponding table as shown in Table 1. The process may be performed by the first communication apparatus and/or the second communication apparatus, or may be performed by a node such as another server. Thereafter, the correspondence table may be stored by the first communication apparatus and the second communication apparatus. When the modulation and coding scheme of the $k^{th}$ first communication apparatus needs to be determined, the first communication apparatus and/or the second communication apparatus perform table lookup based on the SNR, the computing capability, and the first norm of the $k^{th}$ first communication apparatus, to obtain a corresponding modulation and coding scheme.

TABLE 1

| Index | Signal-to-noise ratio | Compute capability | Norm of a gradient | Modulation order | Coding bit rate |
|---|---|---|---|---|---|
| 0 | Signal-to-noise ratio range 0 | Computing capability range 0 | Norm of a gradient range 0 | Modulation order 0 | Bit rate 0 |
| 1 | Signal-to-noise ratio range 1 | Computing capability range 1 | Norm of a gradient range 1 | Modulation order 1 | Bit rate 1 |
| ... | | | | | |
| K | Signal-to-noise ratio range K | Computing capability range K | Norm or gradient range K | Modulation order K | Bit rate K |

As shown in Table 1, an index column gives a modulation and coding scheme index. Therefore, when the first communication apparatus indicates the modulation and coding scheme to the second communication apparatus, or the second communication apparatus indicates the modulation and coding scheme to the first communication apparatus, a sender of the modulation and coding scheme can send an index value to an opposite party, and a corresponding modulation scheme and coding bit rate are obtained by searching Table 1 by the opposite party.

Figure 5:
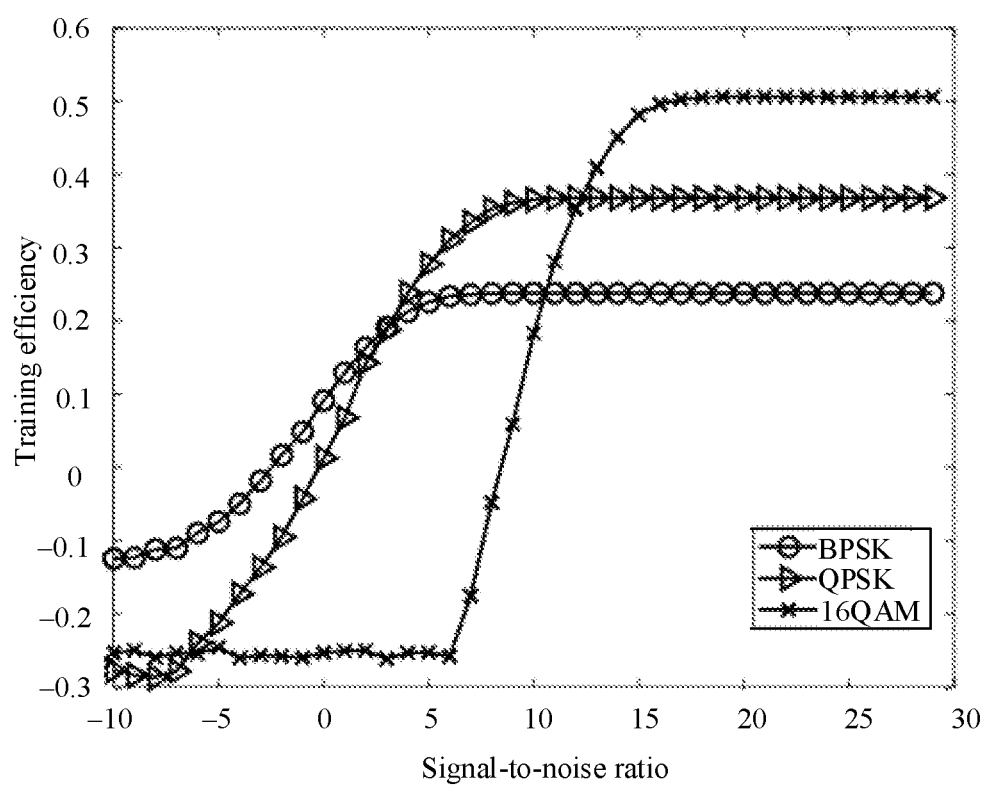
FIG. 5 is a schematic diagram of training efficiency according to an embodiment of this application.

Optionally, a signal-to-noise ratio, a computing capability, and/or a first norm corresponding to a modulation and coding scheme shown in Table 1 may be a range. For example, as shown in FIG. 5, when a signal-to-noise ratio is less than 5 dB, optimal training efficiency may be obtained by using binary phase shift keying (BPSK) modulation (a modulation order is 1). When the signal-to-noise ratio is between 5 dB and 15 dB, optimal training efficiency may be obtained by using quadrature phase shift keying (QPSK) modulation (the modulation order is 2). When the signal-to-noise ratio is greater than 15 dB, the optimal training efficiency can be obtained by using 16QAM (the modulation order is 4).

It should be understood that content shown in the rows and columns in Table 1 is merely an example. Elements in Table 1 may be permutated and combined, split, or merged based on an actual requirement, and replaced with tables in other forms to implement a system or a function similar to those in Table 1. For example, Table 1 may not includes a modulation scheme column and a coding bit rate column, and an additional table can indicate a correspondence between a modulation and coding scheme index and a modulation scheme and a coding bit rate. In addition, data in the table may be represented in another form, for example, a text or a picture. This is not specifically limited herein.

Figure 6:
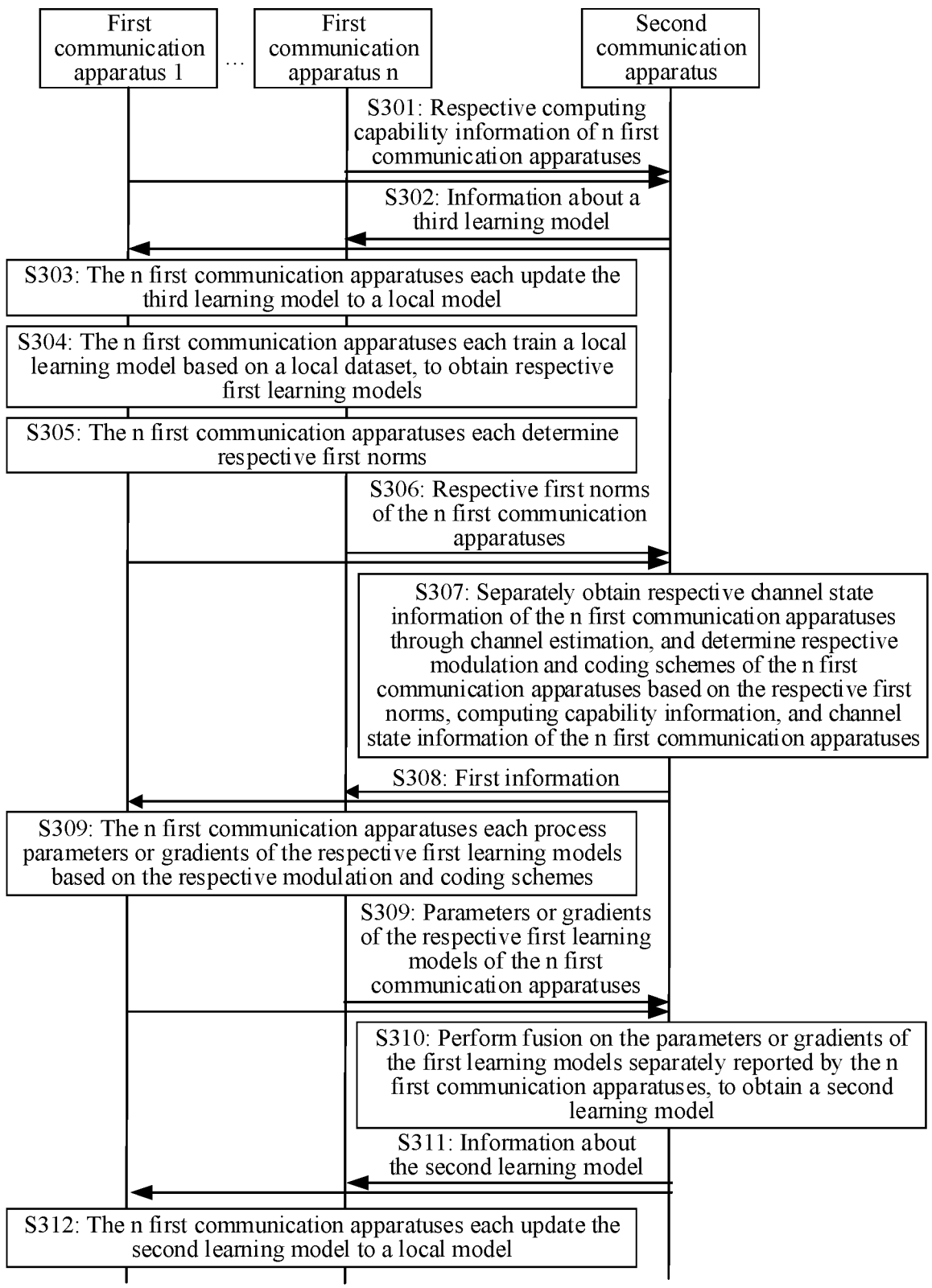
FIG. 6 is a schematic flowchart of another communication method according to an embodiment of this application.

With reference to FIG. 4, the foregoing describes an example in which the second communication apparatus separately determines the modulation and coding schemes of the n first communication apparatuses when n is a positive integer greater than or equal to 2. With reference to FIG. 6, the following describes a process in which the n first communication apparatuses report respective first norms to the second communication apparatus, and the second communication apparatus determines respective modulation and coding schemes of the n first communication apparatuses, where n is a positive integer greater than or equal to 2.

As shown in FIG. 6, the communication method may include the following steps.

S301: The n first communication apparatuses send, to the second communication apparatus, respective computing capability information of the n first communication apparatuses used for indicating respective computing capabilities of the n first communication apparatuses.

The computing capability herein may be a running frequency of a device, an apparatus, a module, or the like that is used for training a learning model, such as a CPU or a graphics processing unit (GPU) of the first communication apparatus.

It should be understood that, a time sequence of S301 is not limited to be performed before S302. For example, S301 may alternatively be performed between S302 and S306. S301 and S305 may alternatively be performed together. In some embodiments, the first communication apparatus carries computing capability information and the first norm of the first communication apparatus through the same signaling.

S302: The second communication apparatus sends a parameter of a third learning model to at least n first communication apparatuses. The third learning model may be a global model currently maintained by the second communication apparatus. For example, if training is in the first round, the third learning model may be an initial global model. If training is not in the first round, the third learning model may be a global model updated by the second communication apparatus in a previous round of training.

S303: The n first communication apparatuses each update the third learning model to the local model.

S304: The n first communication apparatuses each train the local model based on local datasets, to obtain respective first learning models and gradients of the first learning models.

S305: The n first communication apparatuses each determine first norms of the n first communication apparatuses, that is, each determine norms of the gradients of the respective first learning models.

S306: The n first communication apparatuses each report the first norms of the n first communication apparatuses to the second communication apparatus.

S307: The second communication apparatus separately obtains channel state information (such as SNRs) of the n first communication apparatuses through channel estimation, and separately determines modulation and coding schemes of the n first communication apparatuses based on the respective first norms, computing capability information, and channel state information of the n first communication apparatuses.

For a process of separately determining the modulation and coding schemes of the n first communication apparatuses, refer to the foregoing description of solving the problem P2. Alternatively, the second communication apparatus may determine respective modulation and coding schemes of the n first communication apparatuses by querying the modulation and coding scheme indication table shown in Table 1. Details are not described herein again.

S308: The second communication apparatus sends, to the n first communication apparatuses, the first information used for respectively indicating modulation and coding schemes of the n first communication apparatuses.

In S308, a sending manner of the first information includes any one or more of unicast, multicast, or broadcast.

S309: The n first communication apparatuses each process parameters or the gradients of respective first learning models based on the respective modulation and coding schemes, and send processed parameters or gradients of the first learning models to the second communication apparatus.

S310: The second communication apparatus performs fusion on the parameters or gradients of the first learning models that are separately reported by the n first communication apparatuses, to obtain the second learning model. The second learning model is the updated global model.

S311: The second communication apparatus sends a parameter of the second learning model to the n first communication apparatuses.

Optionally, the second communication apparatus sends the parameter of the second learning model to K communication apparatuses including the n first communication apparatuses, where the K communication apparatuses are all communication apparatuses participating in federated learning.

S312: The n first communication apparatuses each update the second learning model to the local model.

Then, S304 to S312 are repeatedly performed until the global model converges or a preset iteration stop condition is reached (for example, a maximum number of rounds of training or a maximum training time is reached).

By using the procedure shown in FIG. 6, when n is a positive integer greater than or equal to 2, the second communication apparatus may determine respective modulation and coding schemes of the plurality of first communication apparatuses based on respective first norms, computing capability information, and channel state information of the plurality of first communication apparatuses. A transmission rate and a bit error rate, in a process that the first communication apparatuses upload the parameters or the gradients of the respective first learning models, are considered in the coding scheme. That is, while ensuring that transmission of the parameter or the gradient of the first learning model is performed as correctly as possible, as little time as possible is used, so that federated learning efficiency for the plurality of first communication apparatuses is optimized.

Figure 7:
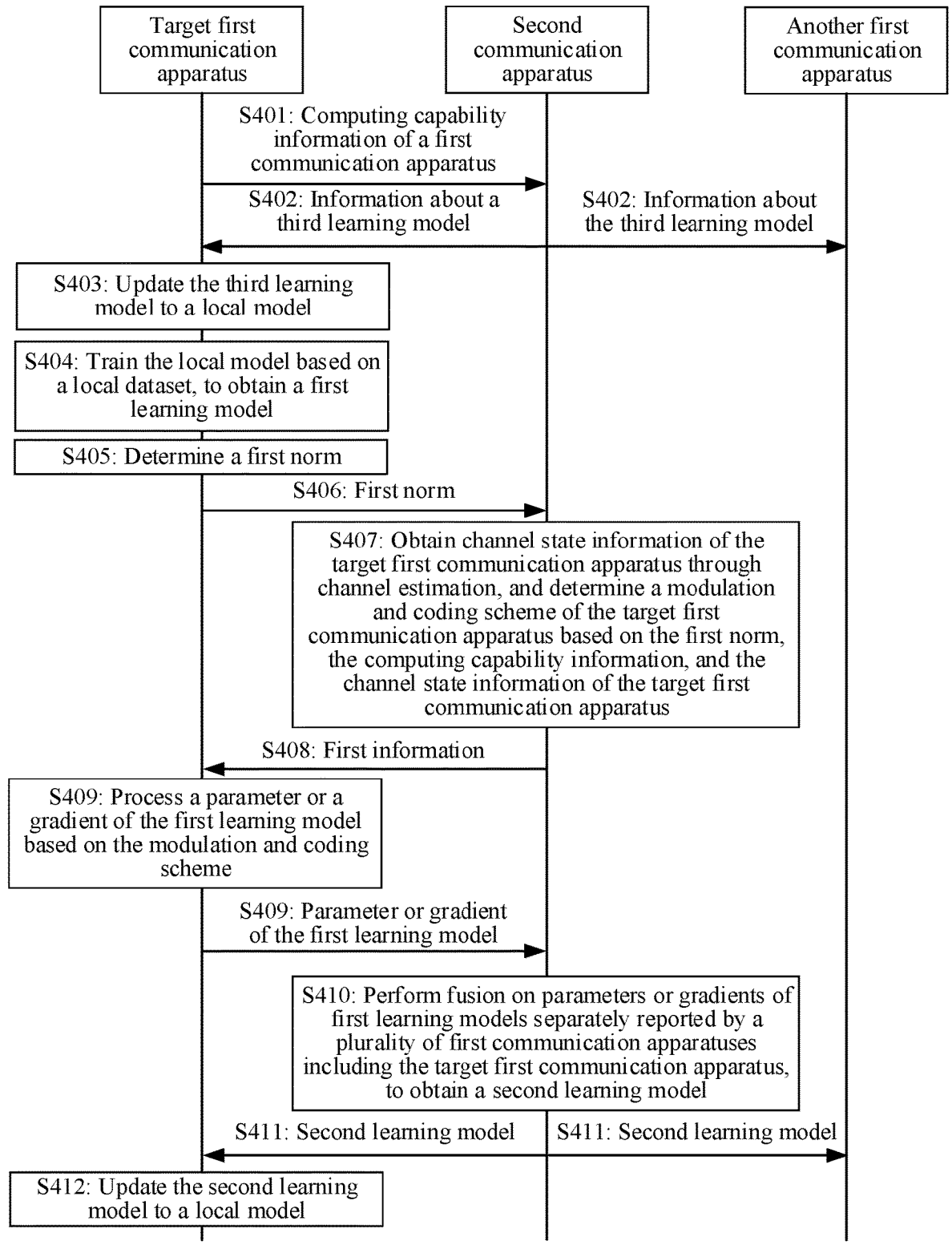
FIG. 7 is a schematic flowchart of another communication method according to an embodiment of this application.

With reference to FIG. 7, a procedure in which n is equal to 1 is shown. The first communication apparatus may be referred to as a target first communication apparatus, and the target first communication apparatus may report the first norm to the second communication apparatus, and the second communication apparatus determines the modulation and coding scheme of the target first communication apparatus is described.

As shown in FIG. 7, the communication method may include the following steps.

S401: The target first communication apparatus sends, to the second communication apparatus, computing capability information of the target first communication apparatus used for indicating a computing capability of the target first communication apparatus. The computing capability herein may be a running frequency of a device, an apparatus, or a module that is used for training a learning model, such as a CPU/GPU of the first communication apparatus.

It should be understood that, a time sequence of S401 is not limited to be performed before S402. For example, S401 may alternatively be performed between S402 and S406. S401 and S405 may alternatively be performed together. In some embodiments, the computing capability information and the first norm are carried through the same signaling.

S402: The second communication apparatus sends information about the third learning model to a plurality of first communication apparatuses including the target first communication apparatus.

The information about the third learning model may be a parameter of the global model. The third learning model may be the global model maintained by the second communication apparatus. For example, if training is in the first round, the third learning model may be an initial global model. If training is not in the first round, the third learning model may be a global model updated by the second communication apparatus in a previous round of training.

S403: The target first communication apparatus updates the third learning model to the local model.

S404: The target first communication apparatus trains the local model based on the local dataset, to obtain a first learning model and a gradient of the first learning model.

S405: The target first communication apparatus determines a norm of the gradient of the first learning model of the target first communication apparatus, that is, the first norm.

S406: The target first communication apparatus reports the first norm of the target first communication apparatus to the second communication apparatus.

S407: The second communication apparatus obtains channel state information (such as an SNR) of the target first communication apparatus through channel estimation, and determines the modulation and coding scheme of the target first communication apparatus based on the first norm, the computing capability information, and the channel state information of the target first communication apparatus.

For a process of determining the modulation and coding scheme of the target first communication apparatus, refer to the foregoing description of solving the problem P3. Alternatively, the second communication apparatus may determine the modulation and coding scheme of the target first communication apparatus by querying the modulation and coding scheme indication table shown in Table 1. Details are not described herein again.

S408: The second communication apparatus sends, to the target first communication apparatus, the first information for indicating the modulation and coding scheme of the target first communication apparatus.

S409: The target first communication apparatus processes the parameter or gradient of the first learning model based on the modulation and coding scheme, and sends the processed parameter or gradient of the first learning model to the second communication apparatus.

S410: The second communication apparatus performs fusion on the parameters or gradients of the first learning models that are separately reported by the plurality of first communication apparatuses including the target first communication apparatus, to obtain the second learning model. The second learning model is the updated global model.

It should be understood that the actions of another first communication apparatus other than the target first communication apparatus are not shown in FIG. 7. During implementation, for a process of reporting the parameter or the gradient of the first learning model by another first communication apparatus, refer to S401 to S409. In other words, in each round of training, the plurality of first communication apparatuses including the target first communication apparatus may separately obtain respective modulation and coding schemes through a process of S401 to S409, and separately report parameters or gradients of respective first learning models.

S411: The second communication apparatus sends, to the target first communication apparatus, the second learning model.

Optionally, the second communication apparatus sends the second learning model to the plurality of first communication apparatuses including the target first communication apparatus.

S412: The target first communication apparatus updates the second learning model to the local model.

Then, S404 to S412 are repeatedly performed until the global model converges or a preset iteration stop condition is reached (for example, a maximum number of rounds of training or a maximum training time is reached).

It can be learned from the procedure shown in FIG. 7 that, when n is equal to 1, the second communication apparatus may determine the modulation and coding scheme of a first communication apparatus (that is, the target first communication apparatus) based on a first norm, computing capability information, and channel state information of the first communication apparatus. The transmission rate and the bit error rate in a process that the first communication apparatus uploads the parameter or the gradient of the first learning model are considered in the coding scheme. That is, while ensuring that the transmission of the parameter or the gradient of the first learning model is performed as correctly as possible, as little time as possible is used, so that the first communication apparatus uploads the parameter or the gradient of the local model based on the modulation and coding scheme, thereby improving training efficiency of the global model.

It should be noted that, compared with the method for determining modulation and coding schemes of the plurality of first communication apparatuses based on the first norms, the computing capability information, and the channel state information of the plurality of first communication apparatuses shown in FIG. 6, a method for determining a modulation and coding scheme of a first communication apparatus based on the first norm, computing capability information, and channel state information of a first communication apparatus suffers from a loss in training efficiency performance. However, the method decouples correlations of a plurality of first communication apparatuses, so that information exchange between the plurality of first communication apparatuses and the second communication apparatus can be performed asynchronously, thereby reducing signaling overheads for maintaining synchronous transmission between the plurality of first communication apparatuses.

Figure 8:
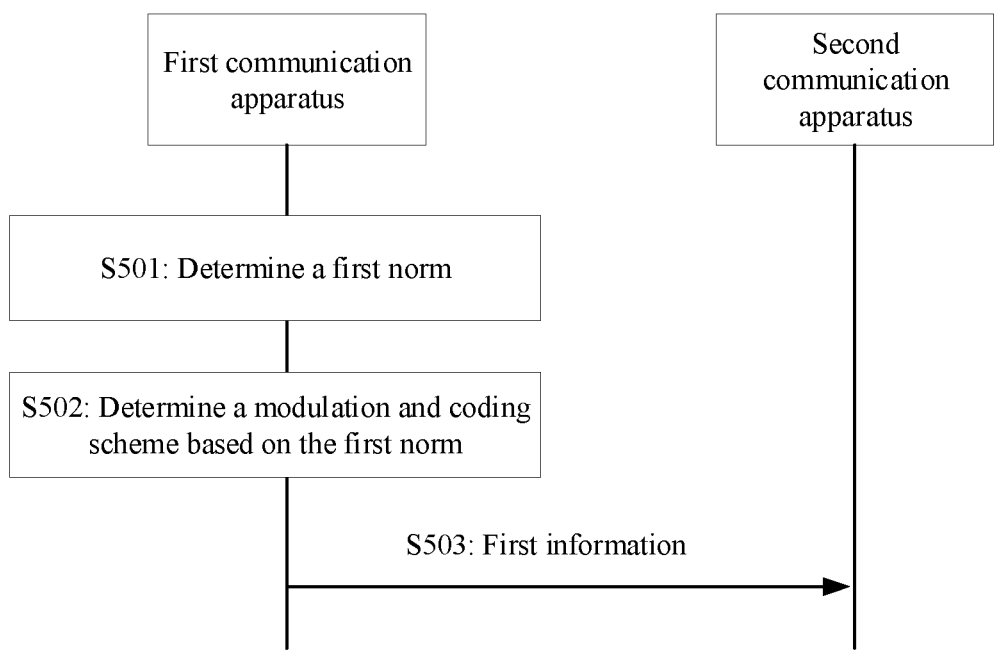
FIG. 8 is a schematic flowchart of another communication method according to an embodiment of this application.

As shown in FIG. 8, in another communication method provided in embodiments of this application, a first communication apparatus participating in federated learning may further determine a modulation and coding scheme applicable to the first communication apparatus based on a first norm of the first communication apparatus. The first communication apparatus uploads a parameter or gradient of a local model of the first communication apparatus to a second communication apparatus based on the modulation and coding scheme, so that efficiency of federated learning can be improved. A process may include the following steps.

S501: The first communication apparatus determines the first norm. The first norm is a norm of a gradient of a first learning model of the first communication apparatus.

It should be understood that the first learning model of the first communication apparatus may be a local model obtained after the first communication apparatus trains a global model based on a local dataset. The global model may come from a second communication apparatus.

For a process in which the first communication apparatus determines the first norm, refer to the description of a manner of determining the first norm in S201. Details are not described herein again to avoid repetition.

S502: The first communication apparatus determines the modulation and coding scheme based on the first norm. The modulation and coding scheme is for processing information about the first learning model of the first communication apparatus, the information about the first learning model is for determining a second learning model, and the second learning model is configured to update the first learning model of the first communication apparatus.

For example, the first communication apparatus may determine the modulation and coding scheme of the first communication apparatus based on a first norm, a computing capability, and a channel state of each first communication apparatus.

The computing capability of the first communication apparatus is known information for the first communication apparatus. The channel state of the first communication apparatus may be obtained by the second communication apparatus through channel measurement and sent to the first communication apparatus.

S503: The first communication apparatus sends first information to the second communication apparatus, where the first information indicates the modulation and coding scheme.

Correspondingly, the second communication apparatus receives the first information and obtains the modulation and coding scheme.

With reference to the foregoing description of the procedure shown in FIG. 4, the first communication apparatus may process (including but not limited to modulating and coding) information of the first learning model based on the modulation and coding scheme, and send processed information to the second communication apparatus. The second communication apparatus may process (including but not limited to demodulating and decoding) information from the first communication apparatus based on the modulation and coding scheme, to obtain information about the first learning model of the first communication apparatus.

For example, the information about the first learning model includes a parameter and/or gradient information of the first learning model, and is used for obtaining the second learning model through fusion. The second learning model is the global model. Subsequently, the second communication apparatus may send the second learning model to the first communication apparatus, and the first communication apparatus updates the local training model based on the second learning model, and performs subsequent local training. A manner of obtaining the second learning model through fusion includes but is not limited to: the second communication apparatus performs fusion based on the information about the first learning model of the first communication apparatus and the information about the first learning model of another first communication apparatus, to obtain the second learning model. The fusion manner is shown in S102.

By using the foregoing method, the first communication apparatus may determine a modulation and coding scheme of the first communication apparatus based on the first norm, and upload information about the first learning model of the first communication apparatus to the second communication apparatus based on the modulation and coding scheme. The first norm represents an importance degree of a local dataset of the first communication apparatus, and the modulation and coding scheme used when a local training result is uploaded is determined based on the first norm, so that efficiency of federated learning can be improved.

In S202, the first communication apparatus may determine a modulation and coding scheme that maximizes training efficiency of the second learning model. The training efficiency is related to a reduced value of a loss function of an $N^{th}$ round of training of the second learning model and a first delay of the $N^{th}$ round of training of the second learning model. Both the reduced value of the loss function and the first delay are determined based on the first norm of the first communication apparatus and the modulation and coding scheme, and N is a positive integer greater than or equal to 1.

In a possible example, the reduced value of the loss function is determined based on a gradient of the second learning model and a mean deviation of the gradient of the second learning model, the mean deviation of the gradient of the second learning model is determined based on the first norm, a number of parameters of the first learning model, and a bit error rate in a process that the first communication apparatus sends the information about the first learning model. The bit error rate in a process that the first communication apparatus sends the information about the first learning model is determined based on the channel state information of the first communication apparatus and the modulation and coding scheme.

The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme. The second delay is a constant value, and may be considered as a known value for the first communication apparatus.

Optionally, solving the modulation and coding scheme that maximizes the training efficiency of the second learning model may be converted into solving the foregoing problem P3. Alternatively, the first communication apparatus may determine the modulation and coding scheme by querying the modulation and coding scheme indication table shown in Table 1.

Figure 9:
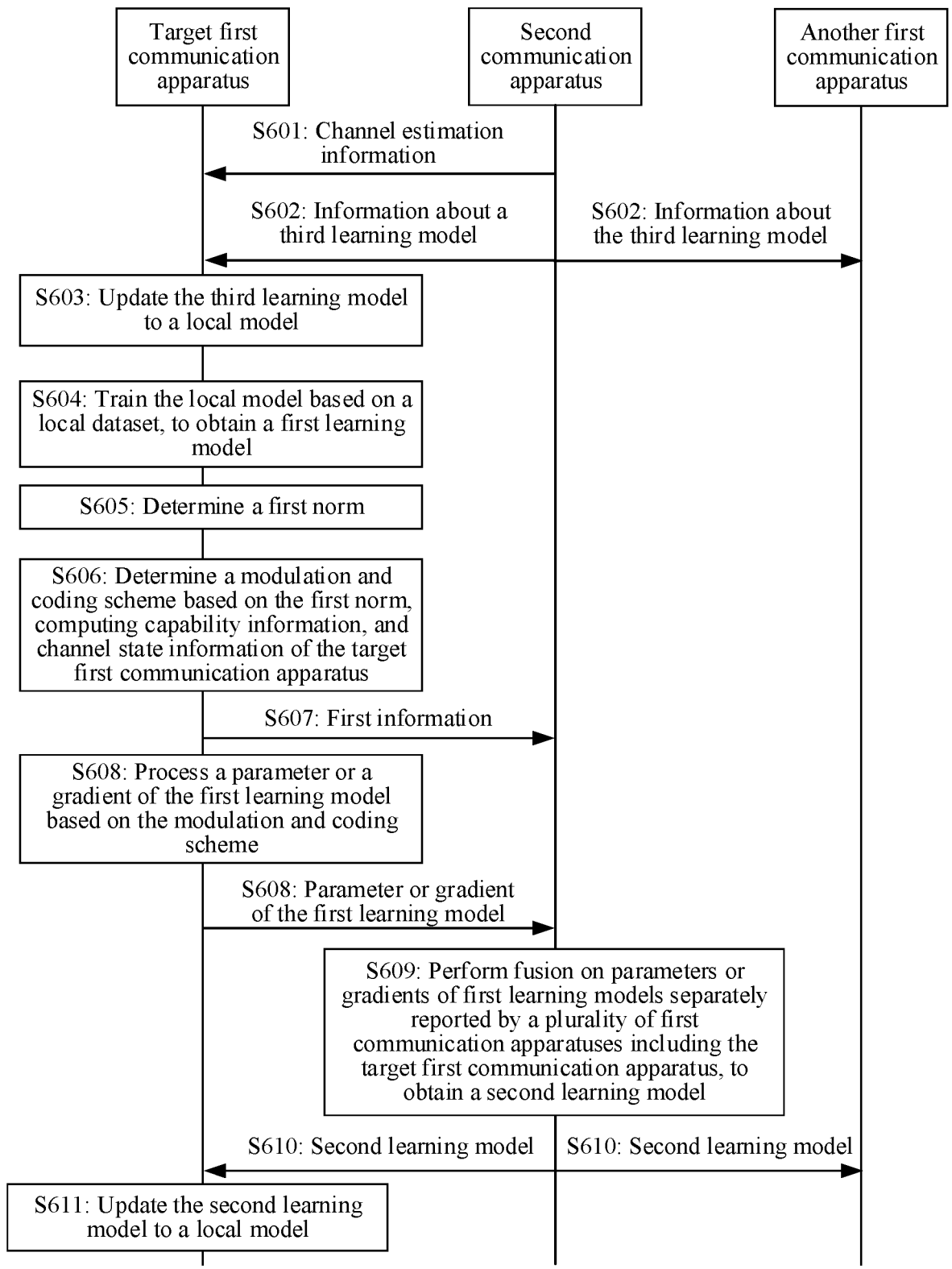
FIG. 9 is a schematic flowchart of another communication method according to an embodiment of this application.

As shown in FIG. 9, if a target first communication apparatus determines a modulation and coding scheme of the target first communication apparatus, the communication method provided in some embodiments of this application may include the following steps.

S601: The second communication apparatus sends channel estimation information, and the target first communication apparatus obtains a channel state (such as an SNR) based on the channel estimation information. For example, the channel estimation information includes a channel state that is of the first communication apparatus and that is determined by the second communication apparatus, or the channel estimation information is used by the first communication apparatus to estimate a channel state of the first communication apparatus.

It should be understood that, a time sequence of S601 is not limited to be performed before S602. For example, S601 may alternatively be performed between S602 and S606. When S601 is performed after S604, S601 may be repeatedly performed.

S602: The second communication apparatus sends, to at least one first communication apparatus, information about a third learning model, where the at least one first communication apparatus includes at least the target first communication apparatus.

The information about the third learning model may be a parameter of the global model. The third learning model may be the global model maintained by the second communication apparatus. For example, if training is in the first round, the third learning model may be an initial global model. If training is not in the first round, the third learning model may be a global model updated by the second communication apparatus in a previous round of training.

S603: The target first communication apparatus updates the third learning model to the local model.

S604: The target first communication apparatus trains the local model based on the local dataset, to obtain a first learning model of the target first communication apparatus and a gradient of the first learning model.

S605: The target first communication apparatus determines a first norm, that is, determines a norm of the gradient of the first learning model of the target first communication apparatus.

S606: The target first communication apparatus determines the modulation and coding scheme based on the first norm, computing capability information, and channel state information of the target first communication apparatus.

For a process of determining the modulation and coding scheme of the target first communication apparatus, refer to the foregoing description of solving the problem P3. Alternatively, the first communication apparatus may determine the modulation and coding scheme by querying the modulation and coding scheme indication table shown in Table 1. Details are not described herein again.

S607: The target first communication apparatus sends, to the second communication apparatus, first information for indicating the modulation and coding scheme.

Correspondingly, the second communication apparatus obtains the modulation and coding scheme.

S608: The target first communication apparatus processes the parameter or gradient of the first learning model based on the modulation and coding scheme, and sends the processed parameter or gradient of the first learning model to the second communication apparatus.

S609: The second communication apparatus performs fusion on the parameters or gradients of the first learning models separately reported by the plurality of first communication apparatuses including the target first communication apparatus, to obtain the second learning model. The second learning model is the updated global model.

It should be understood that actions of another first communication apparatus other than the target first communication apparatus are not shown in FIG. 9. During implementation, for a process of reporting the parameter or the gradient of the first learning model by another first communication apparatus, refer to S601 to S608. In other words, in each round of training, the plurality of first communication apparatuses including the target first communication apparatus may separately obtain respective modulation and coding schemes through a process of S601 to S608, and separately report parameters or gradients of respective first learning models.

S610: The second communication apparatus sends, to the target first communication apparatus, the second learning model.

Optionally, the second communication apparatus sends the second learning model to the plurality of first communication apparatuses including the target first communication apparatus.

S611: The target first communication apparatus updates the second learning model to the local model.

Then, S604 to S611 are repeatedly performed until the global model converges or a preset iteration stop condition is reached (for example, a maximum number of rounds of training or a maximum training time is reached).

It can be learned from the procedure shown in FIG. 9 that the target first communication apparatus determines the modulation and coding scheme of the target first communication apparatus based on a local first norm, local computing capability information, and local channel state information. A transmission rate and a bit error rate in a process that the first communication apparatus uploads the parameter or the gradient of the first learning model are considered in the coding scheme. That is, while ensuring that transmission of the parameter or the gradient of the first learning model is performed as correctly as possible, as little time as possible is used, so that the target first communication apparatus uploads the parameter or the gradient of the local model based on the modulation and coding scheme, thereby improving training efficiency of the global model.

It should be noted that, compared with the method in which the second communication apparatus determines modulation and coding schemes of a plurality of first communication apparatuses based on first norms, computing capability information, and channel state information of the plurality of first communication apparatuses shown in FIG. 6, the method in which the target first communication apparatus determines the modulation and coding scheme of the target first communication apparatus based on the local first norm, computing capability information, and channel state information suffers from a loss in training efficiency performance. However, the method decouples correlations of the plurality of first communication apparatuses, so that information exchange between the plurality of first communication apparatuses and the second communication apparatus can be performed asynchronously, thereby reducing signaling overheads for maintaining synchronous transmission between the plurality of first communication apparatuses.

Figure 10:
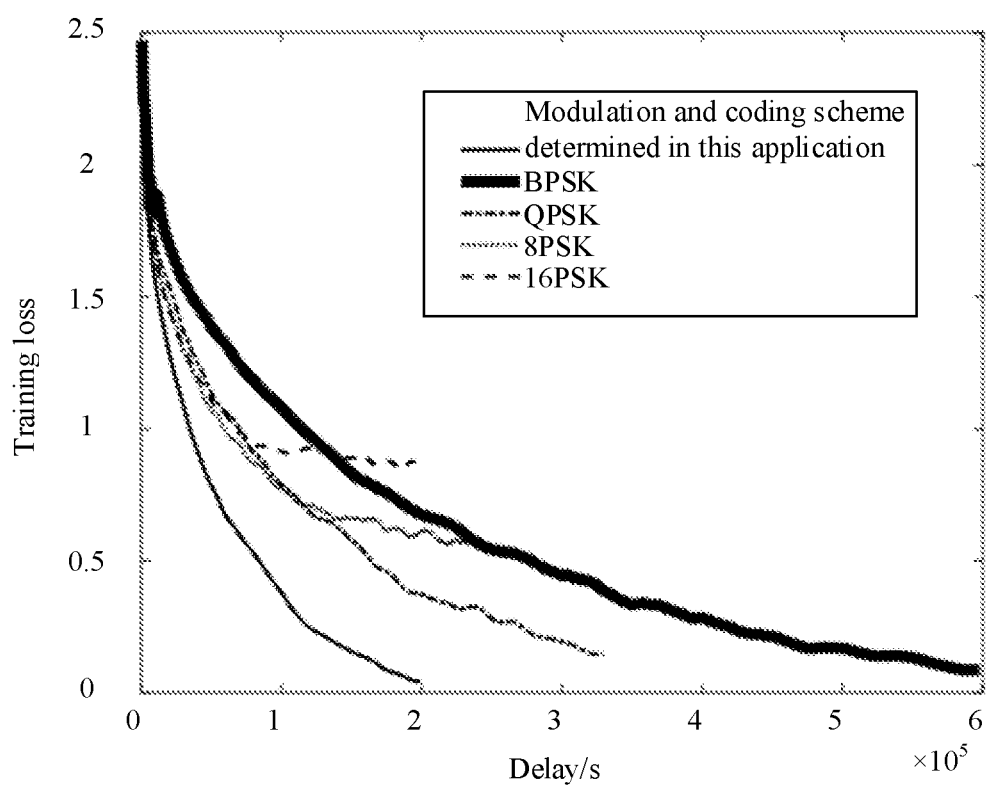
FIG. 10 is a schematic diagram of an effect of a communication method according to an embodiment of this application.
Figure 11:
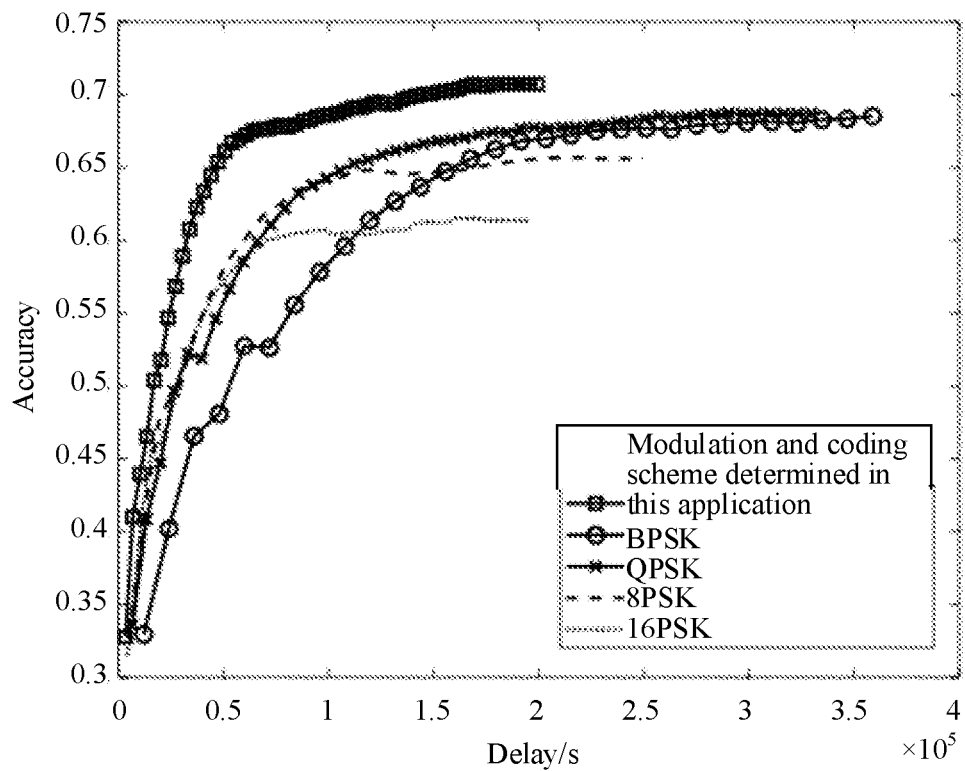
FIG. 11 is a schematic diagram of an effect of another communication method according to an embodiment of this application.

FIG. 10 and FIG. 11 are used as an example in the following to describe a simulation result of the communication method provided in embodiments of this application.

A small cellular network with a radius of 200 meters (m) is considered, and a total of five edge devices participate in federated learning. A base station serving as a central-end server is located in a center of the network, and the five edge devices are evenly distributed. Channel gains of uplink and downlink channels between the base station and the edge device are generated based on a transmission loss model, and meet: 128.1+37.6 log (d). d represents a distance between the edge device and the base station, and the unit is kilometer. A small-scale fading is set to a Rayleigh distribution with a uniform variance. A transmit power of the uplink channel is 26 decibels of milliwatts (dBm) and a bandwidth is 20 megahertz (MHz). The five edge devices have different signal-to-noise ratios, which are respectively 36 decibels (dB), 27 dB, 19 dB, 9 dB, and 3 dB. It is assumed that each gradient element is quantized with 24 bits. For example, classic network classifiers, such as Resnet, Densenet, and Mobilenet, are used. CIFAR10 is used as a dataset, which includes 50,000 training images and 10,000 verification images.

FIG. 10 and FIG. 11 respectively show, a loss reduction situation, and a model accuracy increase situation of the foregoing machine learning model in a training process. For ease of description, a channel coding bit rate may be fixed to 1, and the modulation manner may be determined by using the method provided in some embodiments of the invention. It can be learned from the figures that, when a modulation manner is determined by using the solution of some embodiments of the invention, a faster loss reduction speed and a faster accuracy increase speed can be obtained, and at the same time, a lower loss and a higher model accuracy can be obtained.

Based on a same technical concept as that in the method embodiments, an embodiment of this application provides a communication apparatus. A structure of the communication apparatus may be shown in FIG. 12, and includes a processing unit 1201 and a transceiver unit 1202. The transceiver unit 1202 may communicate with the outside, and the processing unit 1201 is configured to perform processing, for example, perform measurement. The transceiver unit 1202 may also be referred to as a communication interface, a transceiver unit, or a communication unit. The transceiver unit 1202 may be configured to perform an action performed by the first communication apparatus in the foregoing method embodiment, or the transceiver unit 1202 may be configured to perform an action performed by the second communication apparatus in the foregoing method embodiment. Optionally, in some scenarios, the first communication apparatus in this application may be an edge device/a terminal device in a federated learning scenario, and the second communication apparatus may be a central-end server/network device in the federated learning scenario. In some scenarios, the first communication apparatus in this application may alternatively be a central-end server/network device, and the second communication apparatus may be an edge device/a terminal device based on a requirement.

For example, the transceiver unit 1202 includes a sending module and/or a receiving module, respectively configured to perform steps of sending and receiving by the first communication apparatus or the second communication apparatus in the foregoing method embodiments.

In some embodiments, the communication apparatus may further be configured to implement the method performed by the first communication apparatus. For example, the apparatus may be a terminal device, or may be a chip or a chipset or part of a chip that is configured to perform a related method function in the terminal device. The transceiver unit 1202 is configured to perform an operation related to receiving and sending by the first communication apparatus in the foregoing method embodiment. The processing unit 1201 may be configured to perform an operation related to processing by the first communication apparatus in the foregoing method embodiment.

For example, when an action is performed by the first communication apparatus in the procedure shown in FIG. 3, the processing unit 1201 may be configured to determine a first norm. The first norm is a norm of a gradient of a first learning model of the first communication apparatus. The transceiver unit 1202 may be configured to send the first norm. The transceiver unit 1202 may also obtain first information from the second communication apparatus. The first information indicates a modulation and coding scheme. The modulation and coding scheme is for processing information about the first learning model of the first communication apparatus, the information about the first learning model is for determining a second learning model, and the second learning model is configured to update the first learning model of the first communication apparatus. For example, the modulation and coding scheme is determined based on the first norm of the first communication apparatus.

For another example, when an action performed by the first communication apparatus in the procedure shown in FIG. 8 is implemented, the processing unit 1201 may be configured to determine a first norm. The first norm is the norm of the gradient of the first learning model of the first communication apparatus. The processing unit 1201 may also be configured to determine a modulation and coding scheme based on the first norm, where the modulation and coding scheme is for processing information about the first learning model of the first communication apparatus, and the information about the first learning model is for determining a second learning model. The second learning model is configured to update the first learning model of the first communication apparatus. The transceiver unit 1202 may also be configured to send first information to the second communication apparatus, where the first information indicates the modulation and coding scheme.

In a possible design, the processing unit 1201 may further be configured to determine a modulation and coding scheme that maximizes training efficiency of the second learning model. The training efficiency is related to a reduced value of a loss function of an $N^{th}$ round of training of the second learning model and a first delay of the $N^{th}$ round of training of the second learning model, the reduced value of the loss function and the first delay are determined based on the first norm and the modulation and coding scheme, and N is a positive integer greater than or equal to 1.

In a possible design, the reduced value of the loss function is determined based on a gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme. The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

In another implementation, the communication apparatus may be configured to implement the method performed by the second communication apparatus in embodiments. The apparatus may be a network device, or may be a chip or a chipset or part of a chip that is configured to perform a related method function in the network device. The transceiver unit 1202 is configured to perform an operation related to receiving and sending by the second communication apparatus in the foregoing method embodiment. The processing unit 1201 is configured to perform an operation related to processing by the second communication apparatus in the foregoing method embodiment.

For example, when an action performed by the second communication apparatus in the procedure shown in FIG. 3 is implemented, the transceiver unit 1202 may be configured to obtain first norms of n first communication apparatuses. A first norm of an $i^{th}$ first communication apparatus is a norm of a gradient of a first learning model of the $i^{th}$ first communication apparatus, where i=1, 2, . . . , n, and n is a positive integer. The processing unit 1201 may be configured to determine modulation and coding schemes of the n first communication apparatuses based on the first norms of the n first communication apparatuses. A modulation and coding scheme of the $i^{th}$ first communication apparatus is for processing information about the first learning model of the $i^{th}$ first communication apparatus. The information about the first learning model of the $i^{th}$ first communication apparatus is for determining a second learning model, and the second learning model is configured to update the first learning models of the n first communication apparatuses. The transceiver unit 1202 may also be configured to send first information. The first information indicates the modulation and coding schemes of the n first communication apparatuses.

In a possible design, the processing unit 1201 may determine a modulation and coding scheme that maximizes training efficiency of the second learning model. The training efficiency is related to a reduced value of a loss function of an $N^{th}$ round of training of the second learning model and a first delay of the $N^{th}$ round of training of the second learning model, the reduced value of the loss function and the first delay are determined based on the first norms and the modulation and coding schemes, and N is a positive integer greater than or equal to 1.

In a possible design, the reduced value of the loss function is determined based on a gradient of the second learning model and a mean deviation of the gradient of the second learning model, the mean deviation of the gradient of the second learning model is determined based on the first norms, a number of parameters of the first learning model, and a bit error rate in a process that the first communication apparatus sends the information about the first learning model. The bit error rate in a process that the first communication apparatus sends the information about the first learning model is determined based on channel state information of the first communication apparatus and the modulation and coding scheme. The first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus. The third delay is determined based on computing capability information of the first communication apparatus, and the fourth delay is determined based on the modulation and coding scheme.

In a possible design, n is a positive integer greater than or equal to 2.

In a possible design, n is equal to 1.

For another example, when an action is performed by the second communication apparatus in the procedure shown in FIG. 8, the transceiver unit 1202 may be configured to obtain first information from the first communication apparatus. The first information indicates the modulation and coding scheme, the modulation and coding scheme is determined based on a first norm of the first communication apparatus, and the first norm is the norm of the gradient of the first learning model of the first communication apparatus. The processing unit 1201 may be configured to process, based on the modulation and coding scheme, information from the first communication apparatus to obtain information about the first learning model of the first communication apparatus. The information about the first learning model is for determining a second learning model, and the second learning model is configured to update the first learning model of the first communication apparatus.

Division into modules in some embodiments of this application is an example, is merely logical function division, and there may be other division in an actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software function module. For functions or implementations of the modules in embodiments of this application, refer to related descriptions in the method embodiments.

Figure 13:
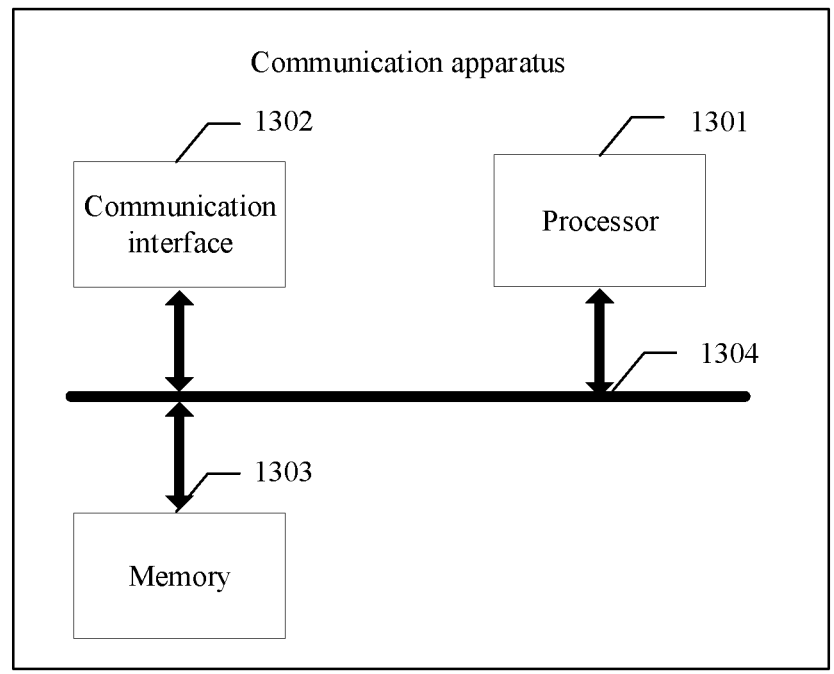
FIG. 13 is a schematic diagram of a structure of another communication apparatus according to an embodiment of this application.

In a possible manner, the communication apparatus may be shown in FIG. 13. The communication apparatus may be a communication device or a chip in a communication device. The communication device may be a terminal device, or may be an access network device. The apparatus may include a processor 1301, a communication interface 1302, and may also include a memory 1303. The processing unit 1201 may be the processor 1301. The transceiver unit 1202 may be the communication interface 1302. It should further be understood that the transceiver unit 1202 may also be an input/output interface. In addition, a function of the transceiver unit 1202 may be implemented by a transceiver. The transceiver may include a transmitter and/or a receiver, which respectively implement functions of a sending unit and a receiving unit.

In the input/output interface, an operation corresponding to receiving or obtaining is inputted, and an operation corresponding to sending is outputted.

The processor 1301 may be a CPU, a digital processing unit, or the like. The communication interface 1302 may be a transceiver, may be an interface circuit such as a transceiver circuit, may be a transceiver chip, or the like. The apparatus further includes: a memory 1303, configured to store a program executed by the processor 1301. The memory 1303 may be a nonvolatile memory such as a hard disk drive (HDD) or a solid-state drive (SSD), or may be a volatile memory such as a random-access memory (RAM). The memory 1303 is any other medium that can be configured to carry or store expected program code in a form of instructions or a data structure and that can be accessed by a computer, but is not limited thereto.

The processor 1301 is configured to execute the program code stored in the memory 1303, and is further configured to perform an action of the processing unit 1201. Details are not described herein again in this application. The communication interface 1302 is further configured to perform an action of the transceiver unit 1202. Details are not described in this application again.

The communication interface 1302, the processor 1301, and the memory 1303 may communicate with each other through an internal connection path, to transfer a control and/or data signal. The memory 1303 is configured to store a computer program, and the processor 1301 is configured to invoke the computer program from the memory 1303 and run the computer program, to control the communication interface 1302 to send and receive a signal. Alternatively, the communication apparatus may further include an antenna, configured to send, through a radio signal, data, control signaling, information, or a message outputted by the communication interface 1302.

The processor 1301 and the memory 1303 may be integrated into one communication apparatus. The processor 1301 is configured to execute program code stored in the memory 1303, to implement the foregoing functions. In some implementations, the memory 1303 may alternatively be integrated into the processor 1301, or may be independent of the processor 1301. The processor 1301 may correspond to the processing unit in FIG. 12.

Figure 12:
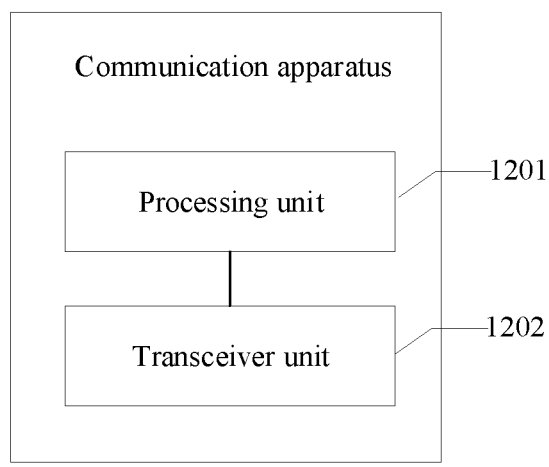
FIG. 12 is a schematic diagram of a structure of a communication apparatus according to an embodiment of this application.

The communication interface 1302 may correspond to the transceiver unit in FIG. 12, and may also be referred to as a transceiver unit or a transceiver. The communication interface 1302 may include a receiver (also referred to as a receiver machine or a receiver circuit) and a transmitter (also referred to as a transmitter machine or a transmitter circuit). The receiver is configured to receive a signal, and the transmitter is configured to transmit a signal.

A specific connection medium between the communication interface 1302, the processor 1301, and the memory 1303 is not limited in embodiments of this application. In some embodiments of this application, in FIG. 13, the memory 1303, the processor 1301, and the communication interface 1302 are connected through a bus 1304, and the bus is represented by a bold line in FIG. 13. A connection manner between other components is merely an example for description, and is not limited thereto. The bus may be classified into an address bus, a data bus, a control bus, and the like. For ease of representation, only one bold line is used to represent the bus in FIG. 13, but this does not mean that there is only one bus or only one type of bus.

An embodiment of this application further provides a communication apparatus, including a processor and an interface. The processor may be configured to perform the method in the foregoing method embodiments.

It should be understood that the communication apparatus may be a chip. For example, the communication apparatus may be a field programmable gate array (FPGA), may be an application specific integrated circuit (ASIC), may be a system on chip (SoC), or may be a CPU, or may be a network processor (NP), or may be a digital signal processor (DSP), or may be a micro controller unit (MCU), or may be a programmable logic device (PLD), or other integrated chip.

For example, the interface may be an interface circuit. The interface circuit may be a code/data read and write interface circuit. The interface circuit may be configured to receive a code instruction (the code instruction is stored in the memory and can be read directly from the memory or read from the memory through other devices) and transmit to the processor. The processor may be configured to run the code instruction to perform the method in the foregoing method embodiments.

For another example, the interface circuit may alternatively be a signal transmission interface circuit between a communication processor and the transceiver. For example, in a sending scenario, the processor is configured to execute XX to obtain Y data (XX is a non-air interface operation, including but not limited to determining, judging, processing, calculating, searching, and comparing operations). The interface circuit may be configured to send the Y data to the transmitter (the transmitter is configured to perform a sending operation on the air interface). In another example of a receiving scenario, the interface circuit may be configured to receive Z data from a receiver (the receiver is configured to perform a receiving operation on an air interface), and send the Z data to the processor. The processor is configured to perform XX processing on the Z data.

Figure 14:
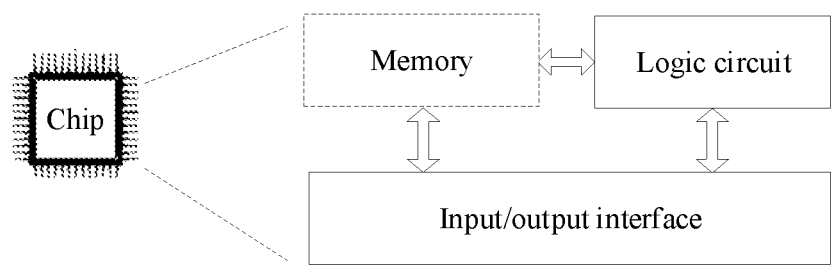
FIG. 14 is a schematic diagram of a structure of another communication apparatus according to an embodiment of this application.

For example, FIG. 14 shows a possible chip structure. The chip includes a logic circuit and an input/output interface, and may further include a memory. The input/output interface may be configured to receive a code instruction (the code instruction is stored in the memory and can be read directly from the memory or read from the memory through other devices) and transmit to the logic circuit. The logic circuit may be configured to run the code instruction to perform the method in the foregoing method embodiments.

Alternatively, the input/output interface may be a signal transmission interface circuit between the logic circuit and the transceiver. For example, in a sending scenario, the logic circuit is configured to execute XX to obtain Y data (XX is a non-air interface operation, including but not limited to determining, judging, processing, calculating, searching, and comparing operations). The input/output interface may be configured to send the Y data to the transmitter (the transmitter is configured to perform a transmission operation on the air interface). For another example, in a receiving scenario, the input/output interface may be configured to receive Z data from a receiver (the receiver is configured to perform a receiving operation on the air interface, and send the Z data to the logic circuit. The logic circuit is configured to perform XX processing on the Z data.

An embodiment of this application further provides a computer-readable storage medium configured to store computer software instructions to be executed by the foregoing processor.

A person skilled in the art would understand that embodiments of this application may be provided as a method, a system, or a computer program product. Therefore, this application describes hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that includes computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a function in one or more processes in the flowcharts and/or in one or more blocks in the block diagrams.

These computer program instructions may be stored in a computer-readable memory that can instruct the computer or another programmable data processing device to work, so that the instructions stored in the computer-readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operation steps are performed on the computer or another programmable device, thereby generating computer-implemented processing. Therefore, the instructions executed on the computer or another programmable device provide steps for implementing a function in one or more processes in the flowcharts and/or in one or more blocks in the block diagrams.

A person having ordinary skill in the art could make various modifications and variations to this application without departing from the spirit and scope of this application. This application is intended to cover these modifications and variations of this application, provided that they fall within the scope of protection defined by the following claims and their equivalent technologies of this application.

It should be understood that, in embodiments of this application, "at least one" refers to one or more, and "a plurality of" refers to two or more. The term "and/or" is an association relationship for describing associated objects and represents that three relationships may exist. For example, A and/or B may represent the following three cases: Only A exists, both A and B exist, and only B exists, where A and B may be singular or plural. The character "/" generally represents that associated objects are in an "or" relationship. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be one or more.

It should be noted that in this application, the terms such as "example" or "for example" are used to represent an example, an illustration, or a description. Any embodiment or design scheme described as an "example" or "for example" in this application should not be interpreted as being more preferred or advantageous than other embodiments or design schemes. Use of the term "example", "for example", or the like is intended to present a related concept in a specific manner.

In the embodiments of this application, "being used to indicate" may include "being used to directly indicate" and "being used to indirectly indicate". For example, when a piece of indication information is described, to indicate information I, the indication information may directly indicate I or indirectly indicate I, but it does not necessarily mean that the indication information carries I.

What is claimed is:

1. A communication apparatus, comprising:
a transceiver unit, configured to obtain first norms of n first communication apparatuses, wherein a first norm of an $i^{th}$ first communication apparatus is a norm of a gradient of a first learning model of the $i^{th}$ first communication apparatus, wherein i=1, 2, . . . , n, and n is a positive integer; and
a processor, configured to determine modulation and coding schemes of the n first communication apparatuses based on the first norms of the n first communication apparatuses, wherein a modulation and coding scheme of the $i^{th}$ first communication apparatus is for processing information about the first learning model of the $i^{th}$ first communication apparatus, the information about the first learning model of the $i^{th}$ first communication apparatus is for determining a second learning model, and the second learning model is configured to update first learning models of the n first communication apparatuses.

2. The communication apparatus according to claim 1, wherein the processor is configured to:
determine a modulation and coding scheme that maximizes training efficiency of the second learning model, wherein the training efficiency is related to a reduced value of a loss function of an $N^{th}$ round of training of the second learning model and a first delay of the $N^{th}$ round of training of the second learning model, the reduced value of the loss function and the first delay are determined based on the first norms and the modulation and coding schemes, and N is a positive integer greater than or equal to 1.

3. The communication apparatus according to claim 1, wherein n is a positive integer greater than or equal to 2.

4. The communication apparatus according to claim 1, wherein n is equal to 1.

5. A communication method, comprising:
determining, by a first communication apparatus, a first norm, wherein the first norm is a norm of a gradient of a first learning model of the first communication apparatus;
determining, by the first communication apparatus, a modulation and coding scheme based on the first norm, wherein the modulation and coding scheme is for processing information about the first learning model of the first communication apparatus, the information about the first learning model is for determining a second learning model, and the second learning model is configured to update the first learning model of the first communication apparatus; and
sending, by the first communication apparatus, first information to a second communication apparatus, wherein the first information indicates the modulation and coding scheme.

6. The method according to claim 5, wherein the determining, by the first communication apparatus, the modulation and coding scheme based on the first norm comprises:
determining, by the first communication apparatus, a modulation and coding scheme that maximizes training efficiency of the second learning model, wherein the training efficiency is related to a reduced value of a loss function of an $N^{th}$ round of training of the second learning model and a first delay of the $N^{th}$ round of training of the second learning model, the reduced value of the loss function and the first delay are determined based on the first norm and the modulation and coding scheme, and N is a positive integer greater than or equal to 1.

7. The method according to claim 6, wherein
the reduced value of the loss function is determined based on a gradient of the second learning model and a mean deviation of the gradient of the second learning model, the mean deviation of the gradient of the second learning model is determined based on the first norm, a number of parameters of the first learning model, and a bit error rate in a process that the first communication apparatus sends the information about the first learning model, and the bit error rate in a process that the first communication apparatus sends the information about the first learning model is determined based on channel state information of the first communication apparatus and the modulation and coding scheme; and
the first delay is determined based on a second delay of sending, by the second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus, the third delay is determined based on computing capability information of the first communication apparatus, and the fourth delay is determined based on the modulation and coding scheme.

8. A firstcommunication apparatus, comprising:
a processor, configured to determine a first norm, wherein the first norm is a norm of a gradient of a first learning model of the first communication apparatus, wherein
the processor is further configured to determine a modulation and coding scheme based on the first norm, wherein the modulation and coding scheme is for processing information about the first learning model of the first communication apparatus, the information about the first learning model is for determining a second learning model, and the second learning model is configured to update the first learning model of the first communication apparatus; and
a transceiver, configured to send first information, wherein the first information indicates the modulation and coding scheme.

9. The first communication apparatus according to claim 8, wherein the processor is specifically configured to:
determine a modulation and coding scheme that maximizes training efficiency of the second learning model, wherein the training efficiency is related to a reduced value of a loss function of an $N^{th}$ round of training of the second learning model and a first delay of the $N^{th}$ round of training of the second learning model, the reduced value of the loss function and the first delay are determined based on the first norms and the modulation and coding schemes, and N is a positive integer greater than or equal to 1.

10. The first communication apparatus according to claim 9, wherein
the reduced value of the loss function is determined based on a gradient of the second learning model and a mean deviation of the gradient of the second learning model, the mean deviation of the gradient of the second learning model is determined based on the first norm, a number of parameters of the first learning model, and a bit error rate in a process that the first communication apparatus sends the information about the first learning model, and the bit error rate in a process that the first communication apparatus sends the information about the first learning model is determined based on channel state information of the first communication apparatus and the modulation and coding scheme; and
the first delay is determined based on a second delay of sending, by a second communication apparatus, a parameter of the second learning model to the first communication apparatus, a third delay of determining, by the first communication apparatus, the first learning model, and a fourth delay of sending, by the first communication apparatus, information about a first information model of the first communication apparatus to the second communication apparatus, the third delay is determined based on computing capability information of the first communication apparatus, and the fourth delay is determined based on the modulation and coding scheme.

\* \* \* \* \*